United States Patent [19]
Fritsch et al.

[11] Patent Number: 5,309,307
[45] Date of Patent: May 3, 1994

[54] TIMER CONTROLLED DEVICE FOR CLEANING A MOVING HEAD AND/OR A DRUM OF A PLAYBACK AND/OR RECORDING UNIT

[76] Inventors: Joseph F. Fritsch; Roxanne Y. Fritsch, both of 114 Lansdowne Park, Ballsbridge, Dublin 4, Ireland

[21] Appl. No.: 106,788

[22] Filed: Aug. 16, 1993

Related U.S. Application Data

[63] Continuation of Ser. No. 646,923, Jan. 28, 1991, abandoned.

[30] Foreign Application Priority Data

Jan. 26, 1990 [IE] Ireland .................................. 248/90
Nov. 20, 1990 [IE] Ireland ................................. 4172/90
Dec. 21, 1990 [IE] Ireland ................................. 4646/90

[51] Int. Cl.⁵ ............................................... G11B 5/41
[52] U.S. Cl. .................................................. 360/128
[58] Field of Search ............................... 360/128, 137

[56] References Cited

U.S. PATENT DOCUMENTS

| | | | |
|---|---|---|---|
| 4,462,056 | 7/1984 | Kara ..................................... | 360/128 |
| 4,586,099 | 4/1986 | Suzuki et al. ........................ | 360/128 |
| 4,704,647 | 11/1987 | Hino ..................................... | 360/128 |
| 4,803,583 | 2/1989 | Bogdarski ............................. | 360/137 |
| 5,109,313 | 4/1992 | D'Alayer de Costemore d'Arc ................................... | 360/128 |

FOREIGN PATENT DOCUMENTS

| | | |
|---|---|---|
| 891096 | 11/1981 | Belgium . |
| 0156568 | 10/1985 | European Pat. Off. . |
| 0193367 | 9/1986 | European Pat. Off. . |
| 0210787 | 2/1987 | European Pat. Off. . |
| 2524680 | 10/1983 | France . |

OTHER PUBLICATIONS

Patent Abstracts of Japan, vol. 10, No. 241 (P-488)(2297) Aug. 20, 1986 & JP-A-61 071 409 (Kyushu Hitachi Maxell Ltd), Apr. 12, 1986.
Patent Abstracts of Japan, vol. 13, No. 345 (P-909)(3693) Aug. 3, 1989 & JP-A-1 102 714 (Sharp Corp.), Apr. 20, 1989.

*Primary Examiner*—Robert S. Tupper
*Attorney, Agent, or Firm*—Sughrue, Mion, Zinn, Macpeak & Seas

[57] ABSTRACT

A cleaning device for cleaning a video drum or video head of a video unit comprises a cassette tape type housing. A carrier arm pivotal in the housing carries a brush for cleaning the video drum and video head. A linkage arm under the action of a drive spring pivots the carrier arm into cleaning engagement with the video drum. A control member under the action of a return spring pivots the linkage arm to return the carrier arm. A timing wheel times a cleaning cycle and controls the linkage arm and the control member.

29 Claims, 15 Drawing Sheets

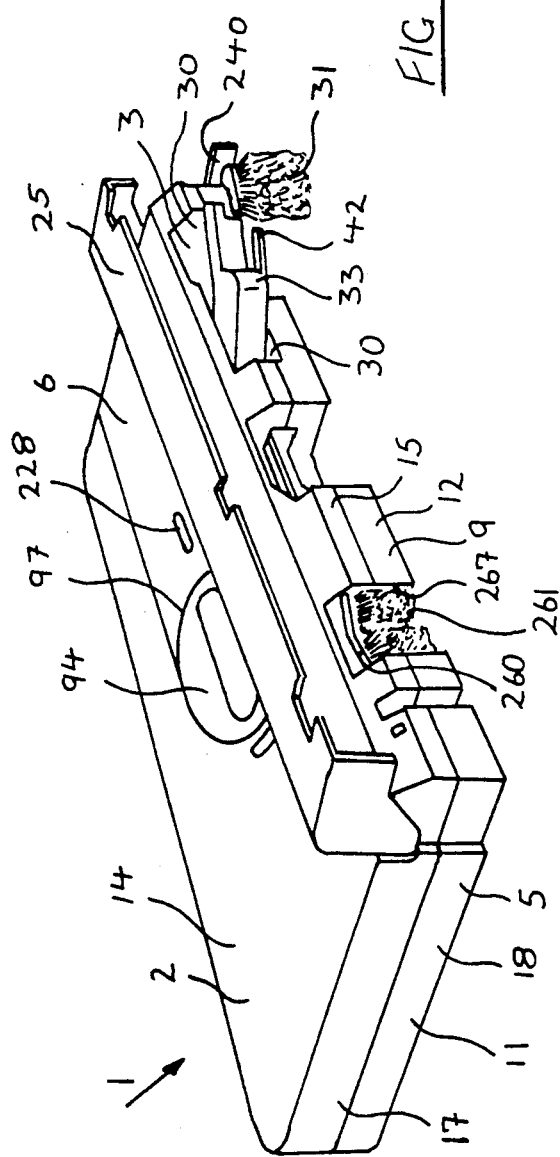
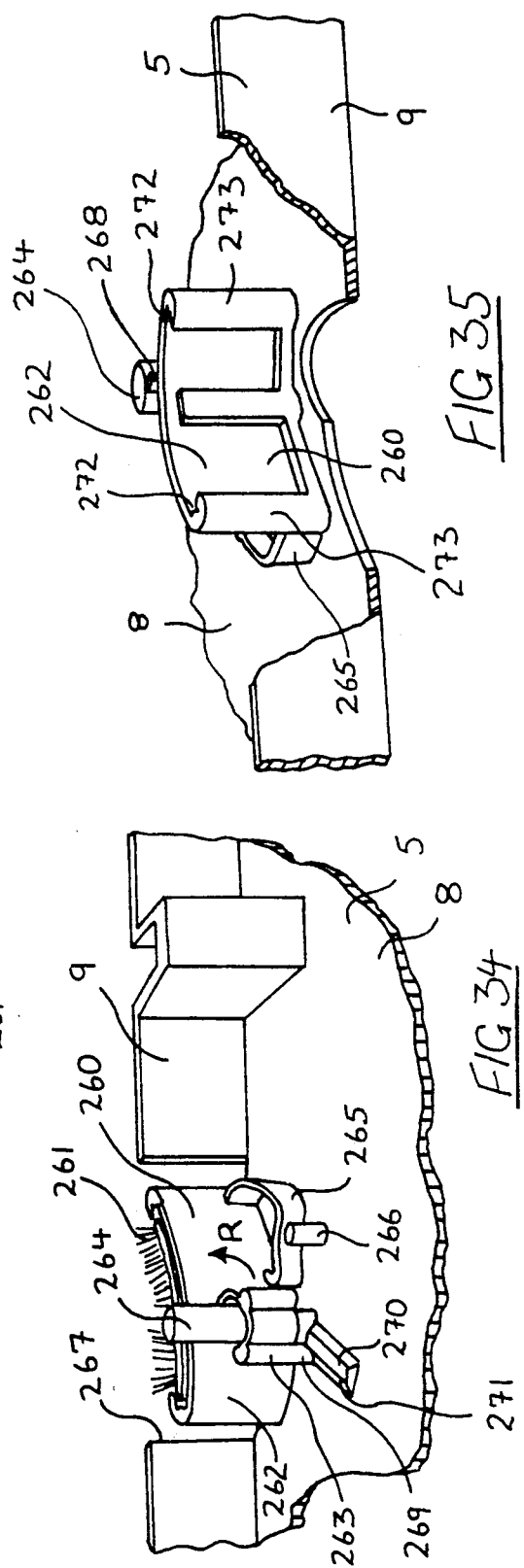

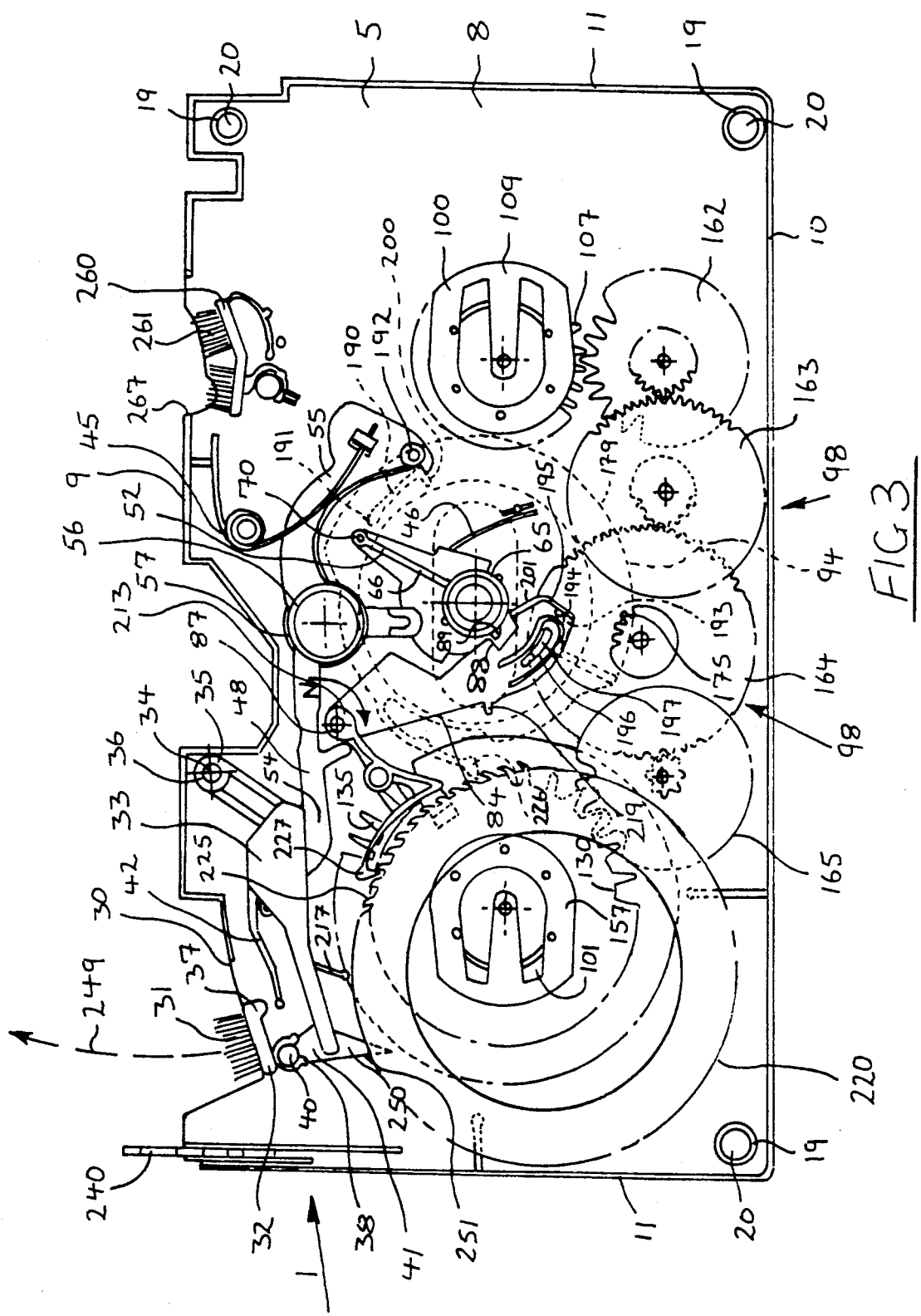

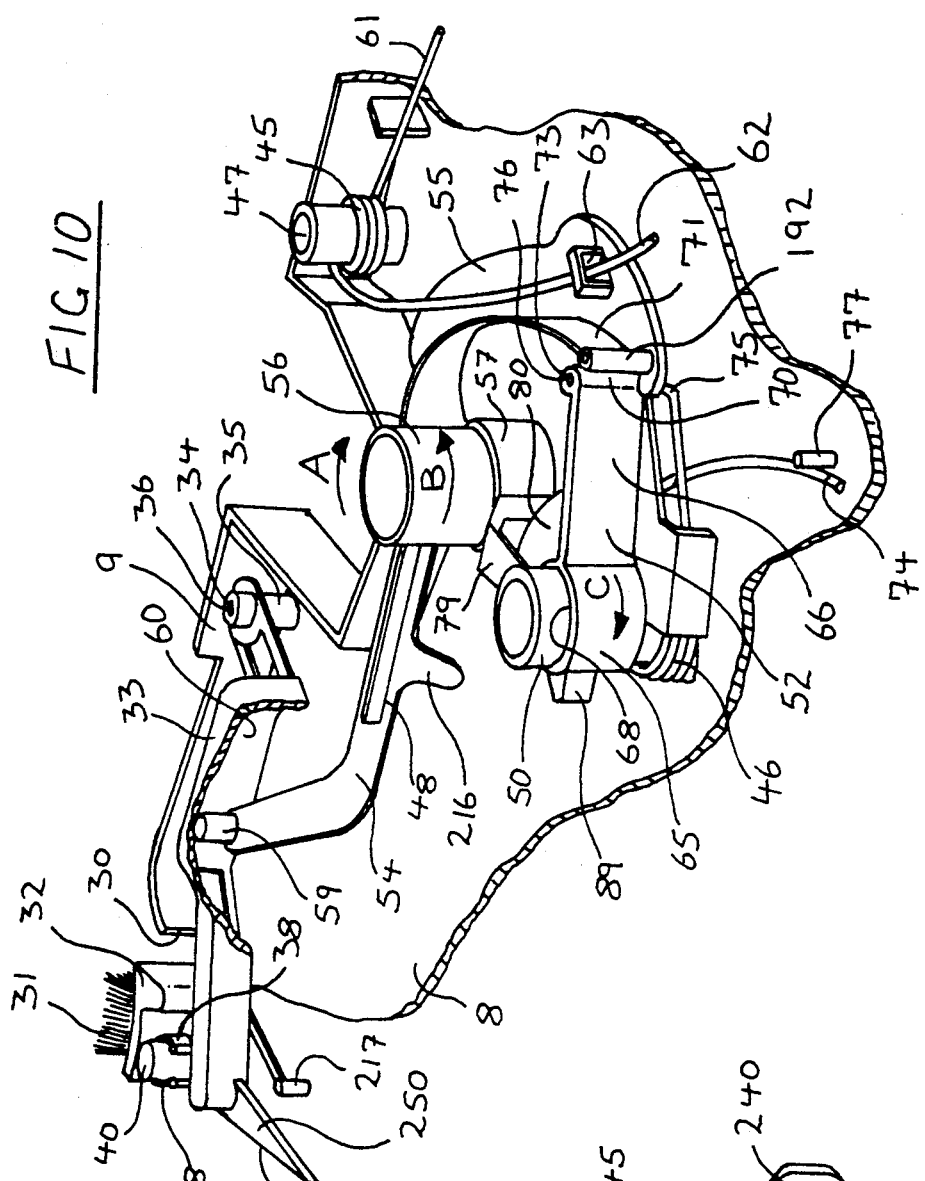

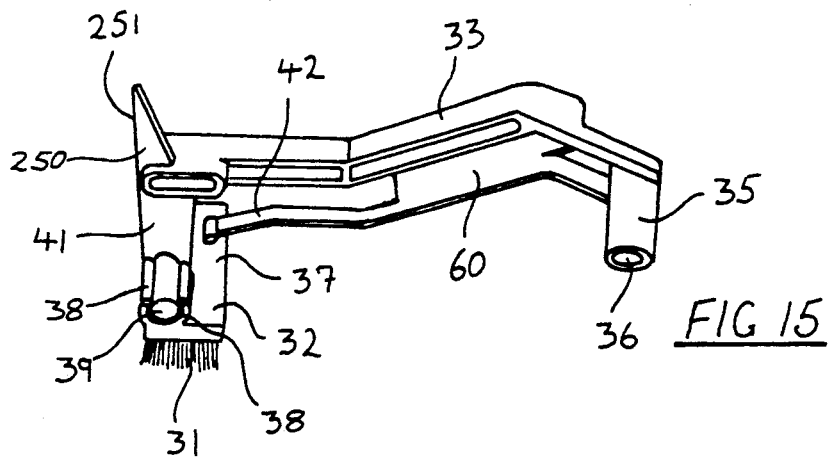
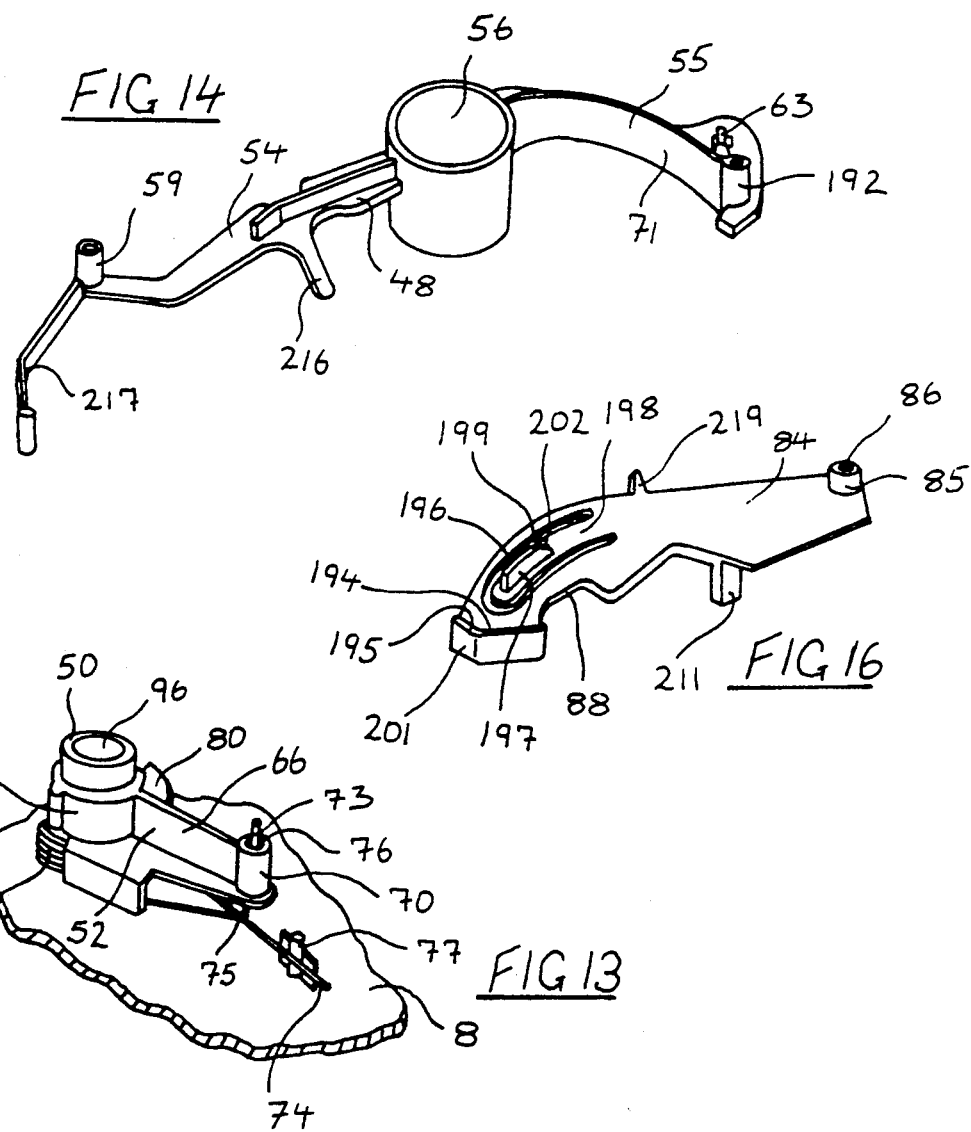

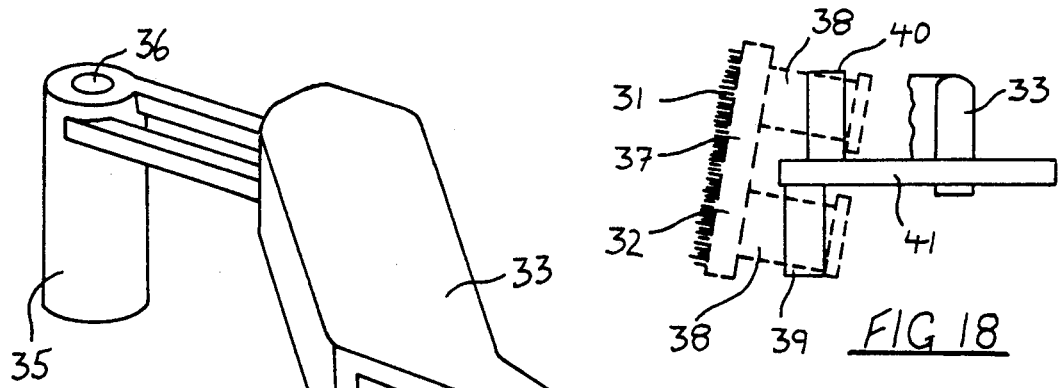
FIG 17
FIG 18
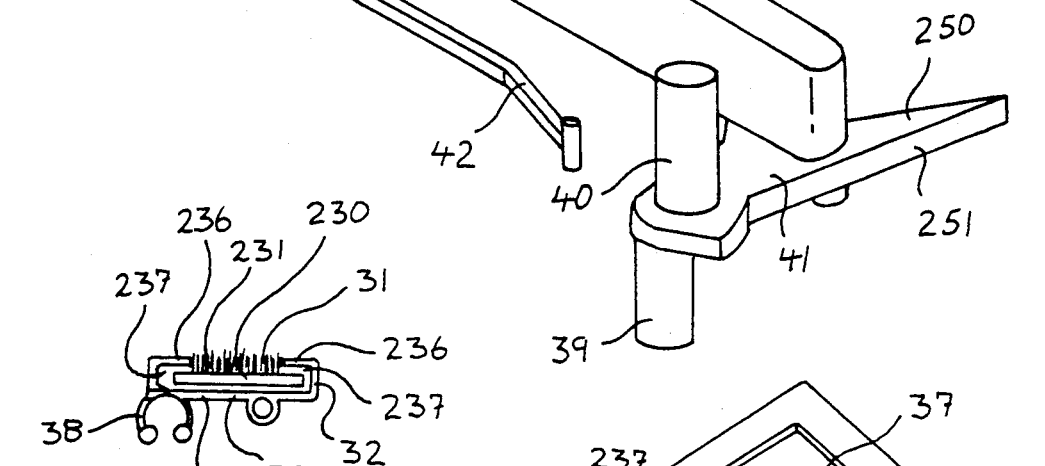
FIG 19
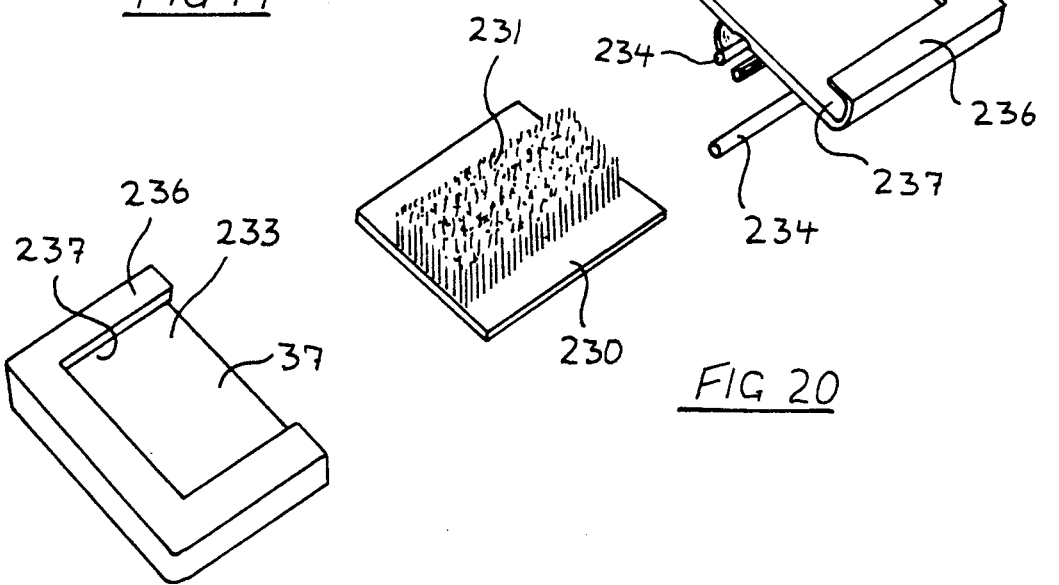
FIG 20

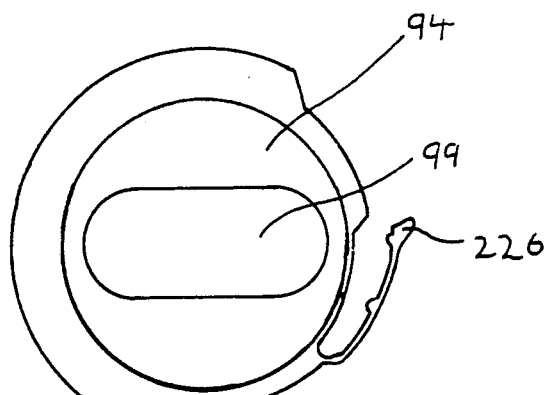
FIG. 23
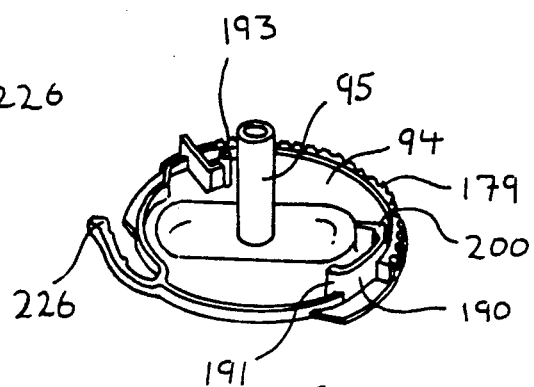
FIG. 24
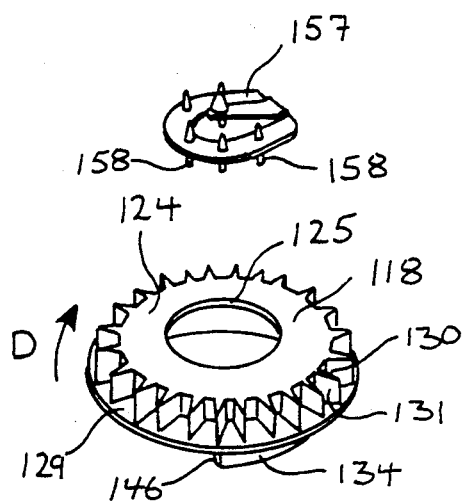
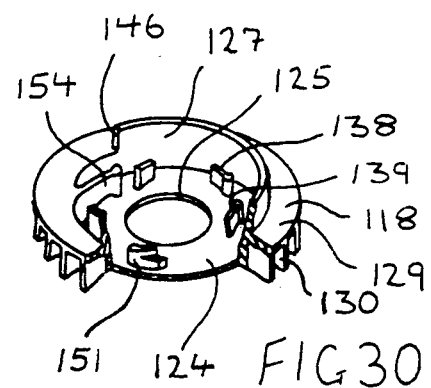
FIG. 30
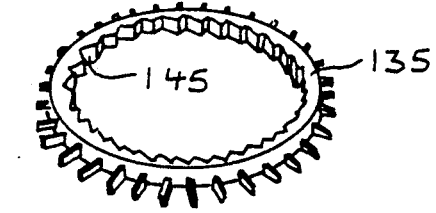
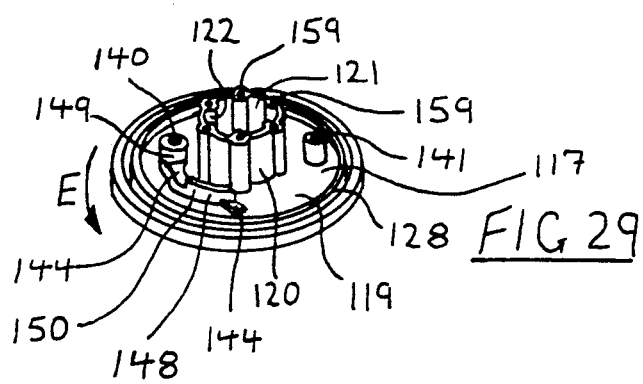
FIG. 29

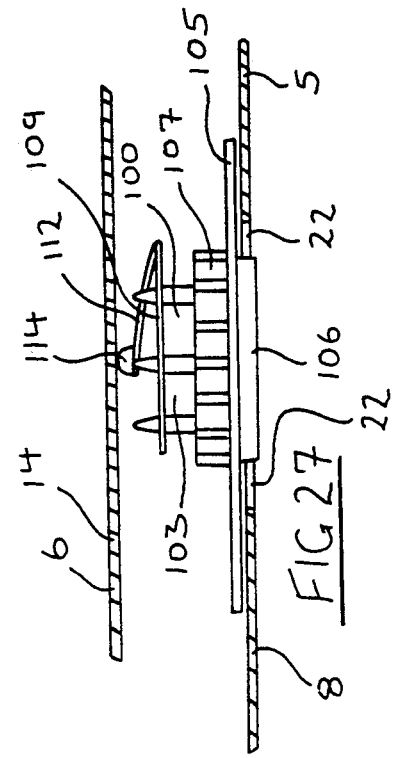
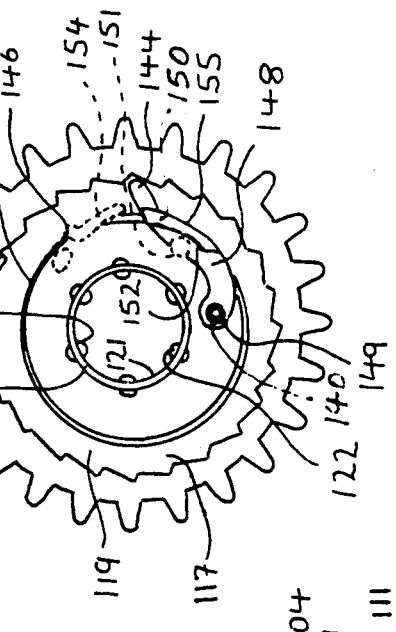
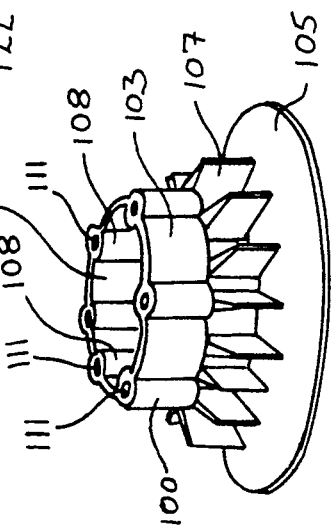
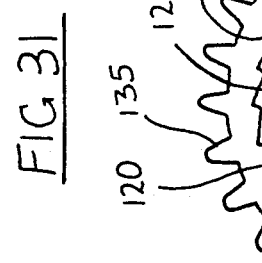
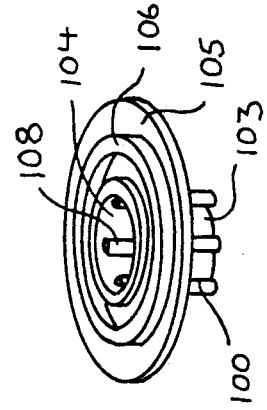

TIMER CONTROLLED DEVICE FOR CLEANING A MOVING HEAD AND/OR A DRUM OF A PLAYBACK AND/OR RECORDING UNIT

This is a Continuation of application Ser. No. 07/646,923 filed Jan. 28, 1991, now abandoned.

FIELD OF THE INVENTION

The present invention relates to a treatment device for a moving head and/or drum of a playback and/or recording unit, and in particular, though not limited to a cleaning device for cleaning a moving head and/or drum of a playback and/or recording unit, for example, a video unit.

BACKGROUND TO THE INVENTION

Cleaning devices for cleaning a video drum and a video head of a video unit are known. For example, European Patent Application Specification No. 0,210,787A discloses such a cleaning device. The cleaning device comprises a housing substantially similar to the cassette housing of a video tape cassette. A cleaning tape is mounted around a pair of reels which are rotatable in the housing and engagable with the take-up and feed reel spindles of the video unit. The cleaning tape is fed from one reel to the other during a cleaning cycle. A carrier arm pivotally mounted in the housing carries a cleaning brush for cleaning the video drum and video head. On the cleaning tape being drawn out of the housing by the tape guide rollers of the video unit, and being brought into engagement with the video drum, the carrier arm and brush are pivoted outwardly so that the brush engages the video drum assembly and video head for cleaning thereof. The cleaning tape engages the drum and carries out some cleaning thereof in tandem with the cleaning brush. However, in certain cases the use of a cleaning tape for cleaning the drum and video head is undesirable.

Belgian Patent Specification No. 891.096 and Japanese Patent Specifications Nos. 59-63,020A and 58-45,621A all disclose cleaning devices for a video head and video drum of a video unit. These cleaning devices comprise a housing which is substantially similar to the housing of a video tape cassette. In each of these three cleaning devices, a cleaning member is mounted on a carrier arm which is movable from the housing into engagement with the video drum. However, these devices suffer from many disadvantages, in that there is virtually no control over the movement of the carrier arm with the result that the carrier arm or cleaning member can become impaled in the guide rollers and guide arms of the tape control mechanism in the video unit at the start-up and shutdown of the video unit. This, in general, would lead to serious damage being caused to the video unit, which in many cases may be irreparable. A further problem with the devices of the Belgian and Japanese patent specifications is that where a video unit is provided with a detecting mechanism to detect a tape jam in the video unit and to shut down the video unit in the event of a tape jam, these devices do not operate.

Other playback and/or recording units are provided with a moving head and/or drum which may be rotatable or otherwise movable. It is necessary to clean or otherwise treat the moving head and/or drum of such playback and/or recording units. There are many such playback and/or recording units. In general, such playback and/or recording units comprise a moving head and/or drum for recording and/or playing back magnetically and/or electronically encoded data. Such data may be encoded on a tape or other data carrier medium. Such playback and/or recording units may be, for example, a video unit, a digital audio tape recording and/or playback device, a mass data back-up storage recording and/or playback unit for computer data, a camcorder or an eight millimetre RV-2000 unit. Indeed, there are many other such playback and/or recording units. In some such playback and/or recording units, the playback and/or recording head may be rotated to scan the data using a helical scan technique, although needless to say, any other scanning techniques may be used.

There are no suitable devices for treating and/or cleaning the moving head and/or drum of such playback and/or recording units. Indeed, as mentioned above, in the case of video units where cleaning devices are provided, these have been found to be unsatisfactory. Furthermore, other than cleaning, there are no devices for treating the video head and/or video drum of a video unit in any other way.

There is therefore a need for a device for treating the moving head and/or drum of a playback and/or recording unit. In particular, there is a need for a device for cleaning the moving head and/or drum of a playback and/or recording unit. Even more particularly, there is a need for a device for treating, for example, cleaning the video drum and/or video head of a video unit which overcomes the problems of prior art devices.

OBJECTS OF THE INVENTION

One object of the invention is to provide a device for treating the moving head and/or drum of a playback and/or recording unit, for example, for treating the video drum and/or video head of a video unit. Another object of the invention is to provide a device for cleaning a moving head and/or drum of a playback and/or recording unit. A further object of the invention is to provide such a treatment device or cleaning device which overcomes the problems of known cleaning devices. Another object of the invention is to provide a device for treating or cleaning the moving head and/or drum of a playback and/or recording unit which avoids the danger of components of the treatment device becoming impaled on the control mechanism of the playback and/or recording unit. A further object of the invention is to provide a device for treating a moving head and/or drum of a playback and/or recording unit which avoids the danger of the playback and/or recording unit going into a shutdown mode rather than carrying out a treatment and/or cleaning cycle.

A further object of the invention is to provide such a device and/or cleaning device for cleaning the video head and video drum of a video unit, for example, a VHS video unit.

SUMMARY OF THE INVENTION

According to the invention, there is provided a device for treating a moving head and/or a playback and/or recording unit, the unit being of the type comprising a receiving area for receiving a cassette, and having at least one rotatable reel spindle in the cassette receiving area for engaging a tape reel in a cassette, the device comprising a main support member engagable in the cassette receiving area of the unit, a treatment means for treating the head and/or drum, a carrier arm for carrying the treatment means, the carrier arm being mounted on the main support member and being movable from a rest position with the treatment means spaced apart from the head and/or drum, in use, to a treating position with the treatment means engaging the head and/or drum, in use, timing means, and drive means for moving the carrier arm from the rest position to the treating position, the drive means being responsive to the timing means.

In one embodiment of the invention, the timing means comprises means for timing a predetermined delay period prior to the carrier arm being moved to the treating position.

In another embodiment of the invention, transmission means is provided for driving the timing means, the transmission means being operably engagable with one of the reel spindles of the unit. Preferably, the transmission means is engagable with a take-up reel spindle of the unit, the timing means timing the predetermined delay period from commencement of rotation of the take-up reel spindle.

In a further embodiment of the invention, the timing means comprises means for timing a predetermined treatment period after the predetermined delay period has been timed, the drive means being responsive to the timing means for returning the carrier arm to the rest position on the timing means having timed the predetermined treatment period.

Advantageously, the drive means comprises a first drive means for moving the carrier arm from the rest position to the treating position and a second drive means for returning the carrier arm from the treating position to the rest position. Preferably, the first and second drive means comprise a drive spring and a return spring, respectively.

In another embodiment of the invention, the timing means comprises a timing member, the timing member being mounted on the main support member and being operably engagable with and drivable by the transmission means from a set position for commencing a timing cycle to a timed out position, having timed the timing cycle, the means for timing the predetermined delay period comprising a first camming means mounted on the timing member and being co-operable with a corresponding second camming means for retaining the carrier arm in the rest position, and the means for timing the predetermined treatment period comprising a third camming means on the timing member, the third camming means being co-operable with corresponding fourth camming means for activating the second drive means.

Preferably, a control member is pivotally mounted on the main support member and is operatively connected to the carrier arm, the control member being movable from an inactive position to an active position by the second drive means for returning the carrier arm to the rest position, the control member being movable by the timing member into the inactive position on the timing member being moved into the set position, latch means being mounted on the main support member for retaining the control member in the inactive position, the fourth camming means being mounted on the latch means, and being engagable with the third camming means on the timing member for moving the latch means into an unlatched position for releasing the control member on the timing member having timed out.

In a further embodiment of the invention, stop means for stopping rotation of one of the reel spindles for putting the unit into a shutdown mode are provided, the stop means being responsive to the timing means having timed out.

In one embodiment of the invention, the treatment means comprises a cleaning means for cleaning the head and/or drum, the cleaning means being pivotally mounted on the carrier arm.

In another embodiment of the invention, the main support member is formed by part of a housing, the housing defining a hollow interior region, the carrier arm being pivotally mounted in the housing, and being pivotal from the rest position substantially within the interior region of the housing to the treating position extending substantially out of the housing.

In another embodiment of the invention, the carrier arm is pivotally mounted on the main support member and is pivotal in a clockwise direction when viewed from above from the rest position to the treating position.

Additionally, the invention provides a device for treating a moving head and/or a playback and/or recording unit, the unit being of the type comprising a receiving area for receiving a cassette, and having at least one rotatable reel spindle in the cassette receiving area for engaging a tape reel in a cassette, the device comprising a main support member engagable in the cassette receiving area of the unit, a treatment means for treating the head and/or drum, a carrier arm for carrying the treatment means, the carrier arm being mounted on the main support member and being movable from a rest position with the treatment means spaced apart from the head and/or drum, in use, to a treating position with the treatment means engaging the head and/or drum, in use, drive means for moving the carrier arm from the rest position to the treating position, and for returning the carrier arm from the treating position to the rest position, and trip means for activating the drive means for returning the carrier arm to the rest position, the trip means being responsive to a change in state of the unit. Preferably, the trip means is responsive to one of the reel spindles commencing to rotate or to rotate in a different mode or speed.

Further, the invention provides a device for treating a moving head and/or a playback and/or recording unit, the unit being of the type comprising a receiving area for receiving a cassette, and having at least one rotatable reel spindle in the cassette receiving area for engaging a tape reel in a cassette, the device comprising a main support member engagable in the cassette receiving area of the unit, a treatment means for treating the head and/or drum, a carrier arm for carrying the treatment means, the carrier arm being mounted on the main support member and being movable from a rest position with the treatment means spaced apart from the head and/or drum, in use, to a treating position with the treatment means engaging the head and/or drum, in use, drive means for moving the carrier arm from the rest position to the treating position, timing means for controlling the drive means, the timing means being operable from a set position to a timed out position for timing a timing cycle and being settable from the timed out position to the set position, and transmission means for driving the timing means from the set position to the timed out position, the timing means being disengagable from at least a portion of the transmission means to facilitate setting the timing means from the timed out position to the set position.

The invention further provides a device for treating a moving head and/or a playback and/or recording unit, the unit being of the type comprising a receiving area for receiving a cassette, and having at least one rotatable reel spindle in the cassette receiving area for engaging a tape reel in a cassette, the device comprising a main support member engagable in the cassette receiving area of the unit, a treatment means for treating the head and/or drum, a cover member pivotally mounted on the main support member, and retaining means mounted on the main support member, the retaining means being movable from a disengaged position to an engaged position for engaging and retaining a tensioning arm of the unit which operates a clutch of one of the reel spindles, the retaining means being operatively connected to the cover member so that on pivoting of the cover member on the main support member being engaged in the cassette receiving area of the unit the retaining means is moved into the engaged position.

Further, the invention provides a device for treating a moving head and/or a playback and/or recording unit, the unit being of the type comprising a receiving area for receiving a cassette, and having at least one rotatable reel spindle in the cassette receiving area for engaging a tape reel in a cassette, the device comprising a housing engagable in the cassette receiving area of the unit, the housing defining a hollow interior region, a treatment means for treating the head and/or drum, a carrier arm for carrying the treatment means, the carrier arm being mounted in the interior region of the housing and being movable from a rest position with the treatment means spaced apart from the head and/or drum, in use, to a treating position with the treatment means engaging the head and/or drum, in use, drive means for moving the carrier arm, and transmission means interconnecting a feed reel spindle and a take-up reel spindle of the unit, so that on rotation of at least one of the said reel spindles, the other of said reel spindles is at least partly rotated, the transmission means being provided wholly within the interior region of the housing.

In one embodiment of the invention, the transmission means comprises a gear train comprising a plurality of operatively engaging gears rotatably mounted on the main support member.

In another embodiment of the invention, the transmission means comprises a main rotatable member and a secondary rotatable member, both rotatable members being rotatably mounted in the main support member, the main rotatable member being engagable with a take-up reel spindle, and the secondary rotatable member being engagable with a feed reel spindle in the unit.

Additionally, the invention provides a device for treating a moving head and/or a playback and/or recording unit, the unit being of the type comprising a receiving area for receiving a cassette, and having at least one rotatable reel spindle in the cassette receiving area for engaging a tape reel in a cassette, the device comprising a main support member engagable in the cassette receiving area of the unit, a treatment means for treating the head and/or drum, a carrier arm for carrying the treatment means, the carrier arm being mounted on the main support member and being movable from a rest position with the treatment means spaced apart from the head and/or drum, in use, to a treating position with the treatment means engaging the head and/or drum, in use, timing means, and drive means for returning the carrier arm to the rest position, the drive means being responsive to the timing means for returning the carrier arm to the rest position.

ADVANTAGES OF THE INVENTION

The advantages of the invention are many. One advantage of the invention is that the treatment device according to the invention treats the moving head and/or drum of a playback and/or recording unit effectively. In particular, when the invention provides a cleaning device, effective cleaning of the moving head and/or drum of the playback and/or recording unit is achieved. Another advantage of the invention is that there is virtually no danger of components of the cleaning device or treatment device becoming impaled on the control mechanism of the playback and/or recording unit. This is a particular advantage when the device according to the invention is used for treating and/or cleaning a video drum or video head of a video unit. This advantage in particular is achieved by virtue of the fact that the device according to the invention times a predetermined delay period prior to the treatment period. A further advantage of the invention is that there is virtually no danger of the playback and/or recording unit going into a shutdown mode during the cleaning cycle. This advantage, in particular, is achieved by virtue of the fact that the transmission means operatively interengages the take-up reel spindle and feed reel spindle of the playback and/or recording unit.

A further advantage of the invention is that even should the playback and/or recording unit go into a shutdown mode, the carrier arm and cleaning means are immediately returned to the rest position, thereby avoiding danger of the carrier arm or cleaning device becoming impaled on the control mechanism of the playback and/or recording unit, where the device is used for treating or cleaning the video head or video drum of a video unit, this is a particularly important advantage in that it avoids the danger of any of the components of the device according to the invention becoming impaled on the tape guide mechanism of the video unit. A particularly important advantage of the invention is achieved by virtue of the fact that the device according to the invention dispenses with the need for a tape or cleaning tape to move the cleaning means into engagement with the moving head or drum of the playback and/or recording unit.

These and other objects and advantages of the invention will be readily apparent to those skilled in the art from the following description of a preferred embodiment thereof, given by way of example only, with reference to the accompanying drawings.

BRIEF DESCRIPTION OF THE DRAWINGS

FIG. 2 is a perspective view of the cleaning device of FIG. 1 from a different direction showing portion of the device in a different position to that of FIG. 1, FIG. 3 is a plan view of the cleaning device of FIG. 1 with portion of the device removed, FIG. 10 is a perspective view of a detail of the device of FIG. 1, FIG. 13 is a perspective view of portion of the device illustrated in FIG. 12, FIG. 14 is a perspective view of another portion of the device, FIG. 15 is a perspective view of a further portion of the device, FIG. 16 is a perspective view of another portion of the device, FIG. 17 is a perspective view of the portion of FIG. 15 from a different direction, FIG. 18 is an elevational view of the portion of the device of FIG. 15, FIG. 19 is a plan view of another portion of the device of FIG. 1, FIG. 20 is an exploded perspective view of the portion of the device of FIG. 19, FIG. 23 is a plan view of another portion of the device of FIG. 1, FIG. 24 is a perspective view of the portion of the device of FIG. 23, FIG. 25 is a perspective view of another portion of the device of FIG. 1, FIG. 26 is an underneath perspective view of the portion of the device of FIG. 25, FIG. 27 is an elevational view of the portion of the device of FIG. 25 illustrated mounted in the device, FIG. 29 is an exploded perspective view of part of the portion of the device illustrated in FIG. 28, FIG. 30 is an underneath perspective view of a portion of the device of FIG. 29, FIG. 31 is a plan view showing the portion of FIG. 29 in use, FIG. 32 is a plan view of the portion of the device of FIG. 29 showing the portion in use in a different position to that of FIG. 31, FIG. 33 is a perspective view of a further detail of the device of FIG. 1, FIG. 34 is a perspective view of another detail of the device of FIG. 1, and FIG. 35 is another perspective view of the detail of FIG. 34.

DETAILED DESCRIPTION OF THE INVENTION

Figure 1:
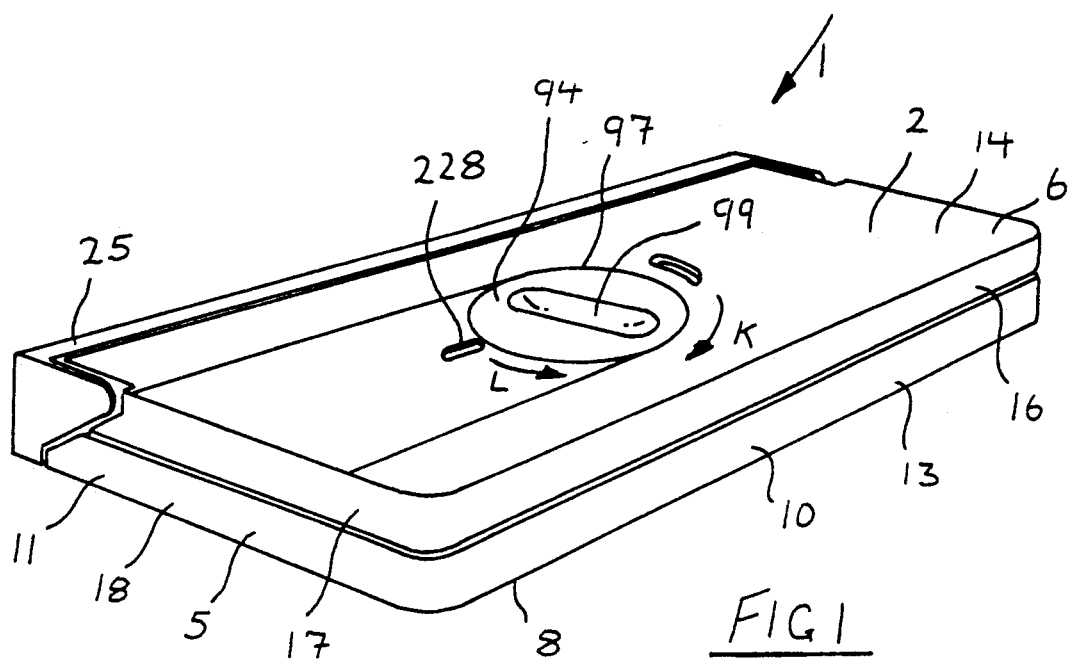
FIG. 1 is a perspective view of a cleaning device according to the invention.

Referring to the drawings, there is illustrated a device according to the invention indicated generally by the reference numeral 1 for treating a moving head and/or drum of a playback and or recording unit. In this embodiment of the invention, the device 1 is a cleaning device 1 and is suitable for cleaning the video drum and also the video head of a video unit, in this case, a VHS recording and/or playback video unit. The device 1 comprises a housing 2 which defines a hollow interior region 3. The housing 2 is of injection moulded plastics material formed in two parts, namely a lower part 5 and an upper part 6. The size and shape of the housing 2 is substantially similar to a cassette housing of a VHS video tape cassette. Accordingly, the housing 2 is suitable for engaging in the cassette receiving area of a VHS video unit.

The lower part 5 of the housing 2 comprises a base 8 which forms a main support member on which the various components of the device 1 which will be described below are mounted. A front wall 9 and a rear wall 10 extend upwardly from the base 8 and are joined by side walls 11. The upper part 6 of the housing 2 comprises a top wall 14, a front wall 15 and a rear wall 16 extending from the top wall 14 and joined by side walls 17. The front wall 9, rear wall 10 and side walls 11 of the lower part 5 engage the corresponding front wall 15, rear wall 16 and side walls 17 of the upper part and form a front wall 12, a rear wall 13 and side walls 18, respectively, of the housing 2, see FIGS. 1 and 2. Posts 19 having bores 20 extend from the base 8 and engage pins 21 with a snap fit action which extend from the top wall 14 for retaining the lower part 5 and upper part 6 of the housing 2 together. Circular openings 22 and 23 are provided in the base 8 for accommodating the take-up reel spindle and the feed reel spindle, respectively, of the video unit. The openings 22 and 23 are substantially similar to corresponding openings which would normally be provided in a tape cassette unit. Other openings, recesses, slots, grooves and the like which will not be described but which are necessary to engage and accommodate various components in the video unit which would normally be found in a VHS video tape cassette housing are also provided in the housing 2. Such openings, recesses, slots, grooves and the like will be well known to those skilled in the art. The front wall 12 of the housing 2 is also shaped substantially similarly to the corresponding front wall of a VHS video tape cassette.

A cover 25 of injection moulded plastics material which is similar to a cover on a VHS video tape cassette is pivotally mounted on the housing 2. Pivot pins 26 extending from the cover 25 pivotally engage slots 27 in the side walls 17 of the upper part 6 of the housing 2. A spring (not shown) on one of the pivot pins 26 biases the cover 25 into a closed position substantially covering the front wall 12 of the housing 2, see FIGS. 1 and 2.

Figure 5:
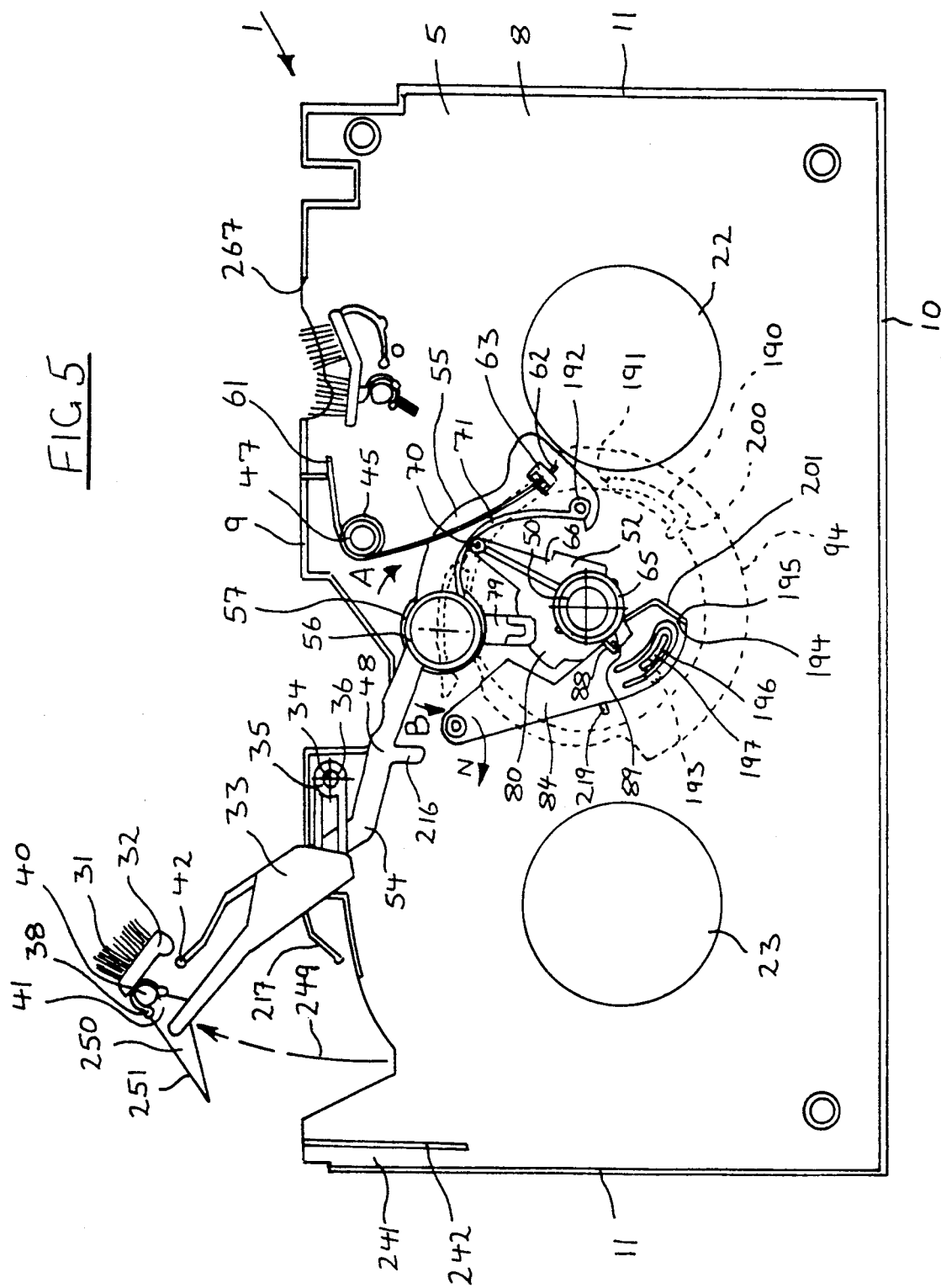
FIG. 5 is a plan view similar to FIG. 4 of the cleaning device with portion of the device in a different position.

An opening 30 formed in the front wall 12 of the housing 2 accommodates a cleaning means, namely, a cleaning brush 31 for cleaning the video drum and video head of the video unit. The brush 31 is releasably mounted in a carrier member 32 which is in turn releasably and pivotally carried on a carrier arm 33. The mounting of the brush 31 in the carrier member 32 and the mounting of the carrier member 32 to the carrier arm 33 is described in detail below. The carrier arm 33 is of injection moulded plastics material and is pivotally mounted on a pivot pin 34 extending upwardly from the base 8. A boss 35 on the carrier arm 33 having a bore 36 extending therethrough pivotally engages the pin 34. The carrier arm 33 is pivotal about the pivot pin 34 from a rest position illustrated in FIG. 3 with the brush 31 and the carrier arm 33 substantially within the interior region 3 of the housing 2 to a treating position, in this case a cleaning position illustrated in FIG. 5 with the brush 31 and the cleaning arm 33 pivoted outwardly of the housing 2 into cleaning engagement with the video drum and the video head. In the rest position, the brush 31, in use, is spaced apart from the drum and the video head of the video unit.

The carrier member 32 is of injection moulded plastics material and comprises a carrier plate 37 for carrying the brush 31, as will be described below. Two pairs of resilient clips 38 integrally moulded with the carrier plate 37 extend therefrom and pivotally engage a pair of pivot shafts, namely, a lower pivot shaft 39 and an upper pivot shaft 40 which are carried by the carrier arm 33. A carrier plate 41 extending from the carrier arm 33 carries the lower pivot shaft 39 and upper pivot shaft 40. The carrier plate 41 and pivot shafts 39 and 40 are integrally moulded with the carrier arm 33. The pivot shafts 39 and 40 are axially offset from each other, the lower pivot shaft 39 being forwardly offset from the upper pivot shaft 40 relative to the front wall 12 of the housing 2. Accordingly, the carrier member 32 is pivotal about a pivot axis which is slightly inclined relative to the rotational axis of the take-up and feed reel spindles. This facilitates good cleaning engagement of the brush 31 with the drum and video head of the video unit. The slight angle at which the carrier member 32 and the brush 31 are presented to the drum accommodates the angle of the rotational axis about which the drum rotates in the video unit. The clips 38 releasably engage the pivot shafts 39 and 40 with a snap on action which also accommodates pivoting of the carrier member 32 relative to the carrier arm 33 about the slightly inclined axis. Further, the clips 38 are sized so as to be a relatively loose fit on the pivot shafts 39 and 40 to accommodate substantially universal pivoting of the carrier member 32 relative to the carrier arm 33. This facilitates good cleaning contact between the brush 31 and the video drum and video head.

A resilient member 42 integrally moulded with and extending from the carrier arm 33 extends to a position rearwardly of the carrier member 32 and engages the carrier plate 37 of the carrier member 32 for urging the carrier member 32 and, in turn, the brush 31 into good cleaning engagement with the video drum and video head when the carrier arm 33 is pivoted into the cleaning position.

Drive means, namely, a first drive means comprising a drive spring 45, and second drive means comprising a return spring 46 are provided for pivoting the carrier arm 33, see FIG. 10. The drive spring 45 is mounted on a post 47 and pivots the carrier arm 33 from the rest position to the cleaning position through a linkage arm 48, which is pivotally mounted in the housing 2. The return spring 46 is mounted on a hollow pivot shaft 50 and is operatively connected to the linkage arm 48 through a control member 52 for returning the carrier arm 33 to the rest position as will be described in detail below. However, before describing the springs 45 and 46 and the control arm 52 in more detail, the linkage arm 48 will first be described.

Figure 9:
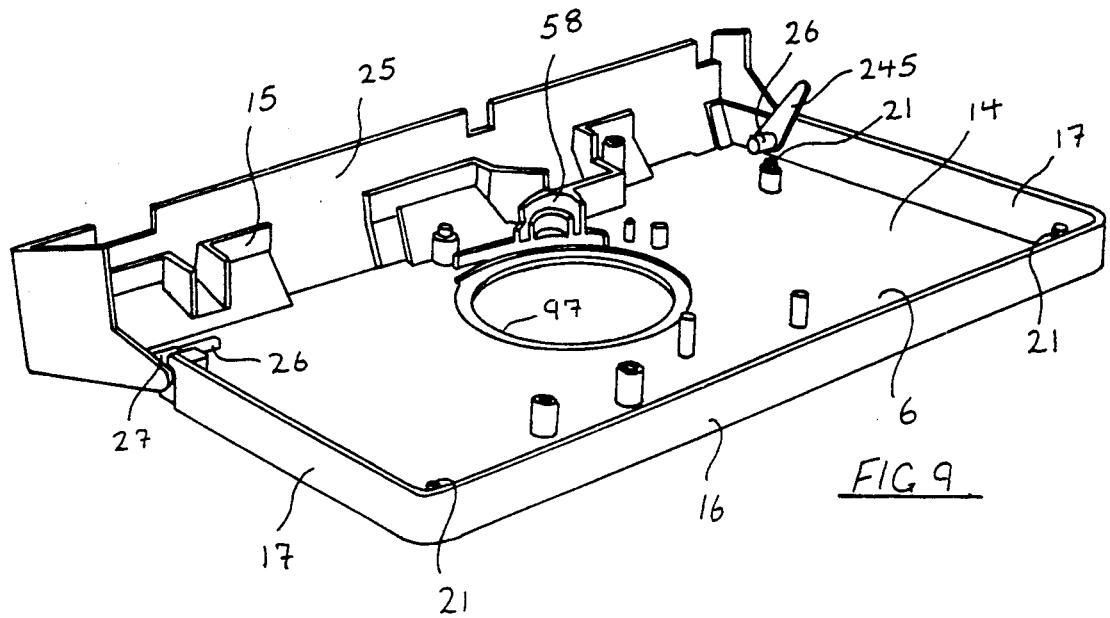
FIG. 9 is a perspective view of portion of the device of FIG. 1.

The linkage arm 48 is of injection moulded plastics material and comprises a main arm 54 and a secondary arm 55 which extend on substantially opposite sides of a central hollow boss 56, see FIGS. 3 to 6, 10 and 14. A hollow tubular member 57 extending from the base 8 pivotally engages one end of the boss 56, see FIG. 10. An annular recess 58 in the top wall 14 pivotally engages the other end of the boss 56, see FIG. 9. The main arm 54 carries a pin 59 which slidably engages a groove 60 in the carrier arm 33 for pivoting the carrier arm 33 from the rest position to the cleaning position and vice versa on pivoting of the linkage arm 48, see FIG. 10. The control member 52, as will be described below, is movable between two positions, namely an inactive position illustrated in FIG. 3 and an active position illustrated in FIG. 6, under the action of the return spring 46. When the control member 52 is in the inactive position, the linkage arm 48 is disengaged from the control member 52 and is free to pivot for pivoting the carrier arm 33 from the rest to the cleaning position. The drive spring 45 is a coiled spring having two free ends 61 and 62 biased away from each other. One end 61 engages the front wall 9 while the other end 62 is connected to the secondary arm 55 by a clip 63 integrally moulded with the secondary arm 55. The biasing action of the ends 61 and 62 urge the linkage arm 48 to pivot in the direction of the arrow A for pivoting the carrier arm 33 from the rest position to the cleaning position, see FIG. 10.

Returning now to the control member 52, the control member 52 is of injection moulded plastics material and comprises a hollow central boss 65 and a radial arm 66 extending radially outwardly therefrom. The control member 52 is pivotally carried on the hollow pivot shaft 50 which engages a bore 68 of the central boss 65. As mentioned above, the control member 52 is movable from the inactive position illustrated in FIG. 3 to the active position illustrated in FIG. 6 under the action of the return spring 46. A follower member 70 formed on the end of the radial arm 66 engages a corresponding camming member 71 on the secondary arm 55 as the control member 52 pivots from the inactive position to the active position for pivoting the linkage arm 48 in the direction of the arrow B for returning the carrier arm 33 to the rest position. The return spring 46 is a coil spring extending round the central boss 65 of the control member 52 and comprises free ends 73 and 74. The free end 73 is cranked at 75 and engages a bore 76 in the follower member 70 at the end of the radial arm 66. The other end 74 of the return spring 46 engages a stop member 77 extending from the base 8. The ends 73 and 74 of the return spring 46 are arranged so that the biasing force in the return spring 46 acts to urge the control member 52 to pivot in the direction of the arrow C from the inactive position to the active position. The urging force in the return spring 46 is greater than the urging force in the drive spring 45 so that on the control member 52 pivoting in the direction of the arrow C to the active position under the action of the return spring 46, the return force being applied by the follower member 70 to the camming member 71 is greater than the urging force being applied to the linkage arm 48 by the drive spring 45, and accordingly, the linkage arm 48 is pivoted in the direction of the arrow B. Thereby, the carrier arm 33 is returned to the rest position.

A retaining lug 79 extending from the tubular member 57 slidably engages a flange 80 extending from the central boss 65 of the control member 52 for retaining the control member 52 on the pivot shaft 50 against the base 8, against any upward action of the return spring 46.

Latch means provided by a latch member 84 retains the control member 52 in the inactive position with the follower member 70 disengaged from the camming member 71 to permit pivoting of the linkage arm 48 in the direction of the arrow A for pivoting the carrier arm 33 into the cleaning position, see FIGS. 3 to 6, 12 and 16. The latch member 84 is of injection moulded plastics material and carries a hollow boss 85 having a bore 86 extending therethrough which pivotally engages a pivot shaft 87. The pivot shaft 87 extends upwardly from the base 8. A mounting member 213 mounted on the shaft 87 retains the latch member 84 on the shaft 87. The purpose of the mounting member 213 is described below. A slot 88 extending into the latch member 84 defines a face 90 which engages a corresponding face 91 on a tooth 89 extending from the central boss 65 of the control member 52 for retaining the control member 52 in the inactive position when the latch member 84 is in a latched position, see FIG. 12. The latch member 84 is pivotal on the pivot shaft 87 from the latched position illustrated in FIGS. 3 and 12 with the slot 88 and tooth 89 engaged, to an unlatched position illustrated in FIG. 6 with the slot 88 and tooth 89 disengaged. In the unlatched position, the control member 52 is free to pivot for returning the carrier arm 33 to the rest position.

Figure 6:
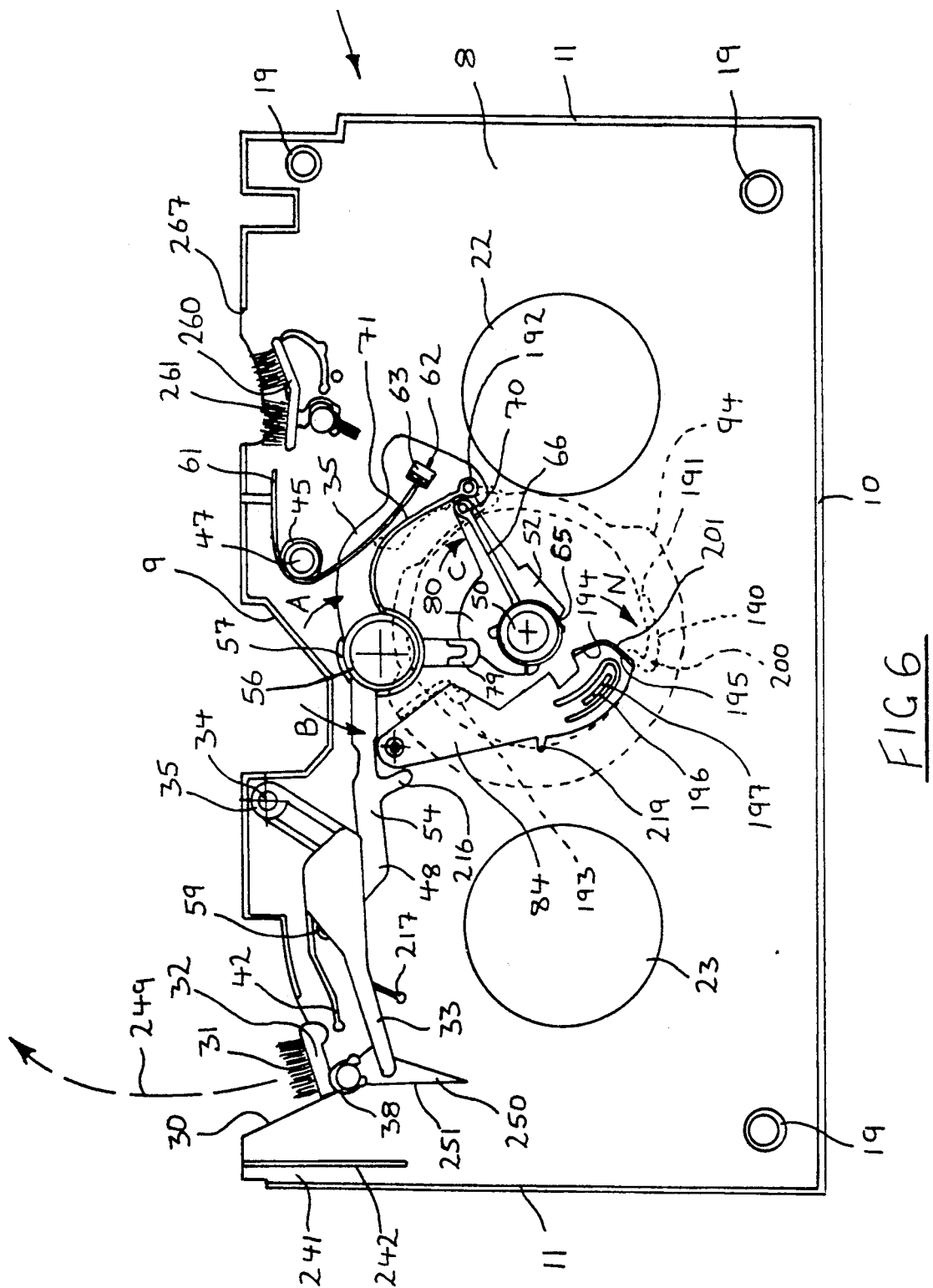
FIG. 6 is a plan view similar to FIG. 4 with the portion of the device in a still further different position.
Figure 7:
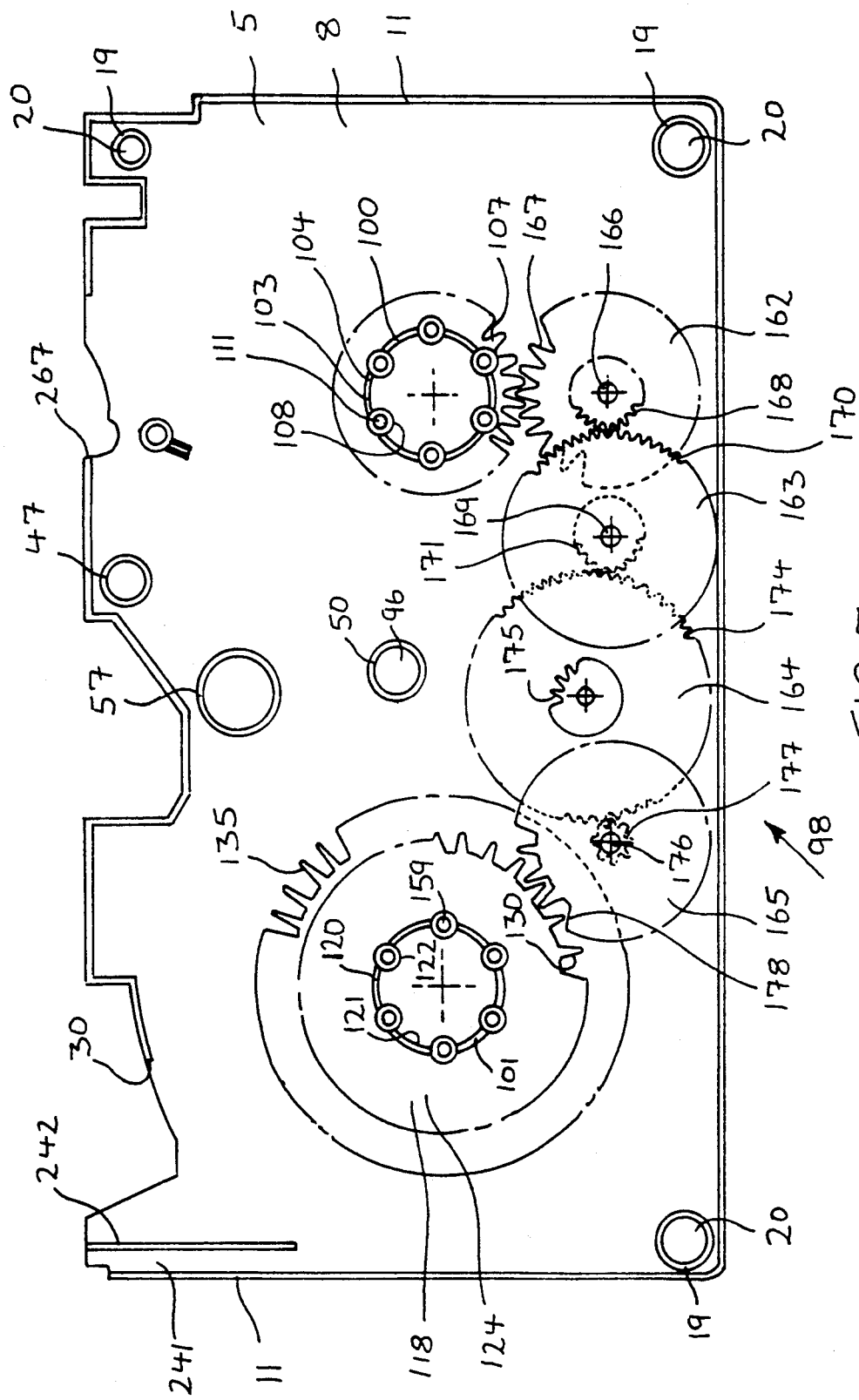
FIG. 7 is a plan view similar to FIG. 3 with other components of the device removed.

In a cleaning cycle in which the carrier arm 33 is pivoted into the cleaning position and returned to the rest position, the movement of the linkage arm 48, the control member 52 and the latch member 84 is controlled by a timing means, which in this embodiment of the invention comprises a timing member, namely, a timing wheel 94, see FIGS. 1 to 6 and 21 to 24. For ease of illustrating the operation of the linkage arm 48, the control member 52 and the latch member 84, the timing wheel 94 is illustrated in broken lines in FIGS. 3 to 6. The timing wheel 94 is of injection moulded plastics material and is movably mounted in the housing 2. In this case, a spindle 95 integrally moulded with the timing wheel 94 rotatably engages a bore 96 in the pivot shaft 50. The timing wheel 94 is rotatable in the bore 50 through 90° from a set position illustrated in FIGS. 2 and 3 ready to commence a timing cycle, to a timed out position at the end of a timing cycle, as illustrated in FIGS. 1 and 6. A circular opening 97 in the top wall 14 accommodates the timing wheel 94 to permit manual setting of the timing wheel 94 into the set position as will be described below. A finger recess 99 in the timing wheel 94 facilitates manual setting of the timing wheel 94. The timing wheel 94 is driven from the set position to the timed out position by the take-up reel spindle of the video unit through a transmission means which comprises a gear train 98. Before describing the timing wheel 94 further and its operation and the timing cycle in more detail, the transmission means will first be described.

The transmission means, as mentioned above, comprises the gear train 98, and as well as driving the timing wheel 94, the gear train 98 also acts to operatively interconnect the take-up reel spindle with the feed reel spindle of the video unit, so that on rotation of at least one of the said spindles, the other of said spindles is at least partly rotated. In this embodiment of the invention, the gear train 98 transmits drive from the take-up reel spindle to the feed reel spindle of the video unit, so that on rotation of the take-up reel spindle in the video unit, the feed reel spindle of the video unit is rotated. This is necessary in some video units to prevent the video unit going into a shutdown mode on sensing nonrotation of the feed reel spindle. The drive transmission means, as well as comprising the gear train 98, also comprises a main rotatable member 100 and a secondary rotatable member 101, both of which are rotatably mounted in the respective openings 22 and 23 of the base 8. The centres of the openings 22 and 23 co-incide with the rotational axes of the respective take-up and feed reel spindles of the video unit. The main rotatable member 100 is engagable with the take-up reel spindle of the video unit, while the secondary rotatable member 101 is engagable with the feed reel spindle.

The main rotatable member 100 is of injection moulded plastics material and comprises a central boss 103 having a bore 104 extending therethrough which engages the take-up reel spindle, see FIGS. 25 to 27. An annular flange 105 extending from the central boss 103 rotatably engages the base 8 of the housing 2. An annular ring 106 extending from the flange 105 rotatably engages the opening 22. A gear 107 which is engagable with the gear train 98 as will be described below is formed around the central boss 103. Splines 108 in the bore 104 engage corresponding splines on the take-up reel spindle of the video unit. A top member 109 is secured to the central boss 103 by pins (not shown) extending from the top member 109 which engage bores 111 in the central boss 103 with a tight fit action. A resilient member 112 extending from the top member 109 carries a pin 114 which engages the top wall 14 of the housing 2 for urging the flange 105 against the base 8 and in turn the annular ring 106 into the opening 22. The outer diameter of the annular ring 106 is less than the diameter of the opening 22, so that the main rotatable member 100 is a relatively loose fit in the opening 22 to facilitate engagement with the take-up reel spindle.

Referring in particular to FIGS. 28 to 32, the secondary rotatable member 101 is of injection moulded plastics material and comprises a base part 117 and a top part 118 rotatable for part of a revolution relative to each other as will be described below. The base part comprises a base disc 119 with a central boss 120 extending upwardly therefrom. A bore 121 through the boss 120 engages the feed reel spindle of the video unit. Splines 122 in the bore 121 engage corresponding splines on the feed reel spindle of the video unit. The base disc 119 rotatably sits on the base 8 of the housing 2 and an annular ring (not shown) but similar to the annular ring 106 of the main rotatable member 100 extends downwardly from the base disc 119, and rotatably engages the opening 23 in the base 8. The outer diameter of the annular ring (not shown) is less than the diameter of the opening 23 to provide a loose fit to facilitate engagement with the feed reel spindle. The top part 118 comprises a top disc 124 having a circular opening 125 extending therethrough for rotatably engaging the central boss 120. A circular wall 127 extends downwardly from the top disc 124 and rotatably engages a groove 128 in the base disc 119. A flange 129 extends outwardly from the central wall 127. A gear 130 is formed by gear teeth 131 extending outwardly from the wall 127 above the flange 129. The gear 130 is engagable with the gear train 98 for rotating the feed reel spindle as will be described below. A portion 134 of the circular wall 127 below the flange 129 rotatably carries a gear 135 between the flange 129 and the base disc 119 as will be described below, and for a purpose to be described below. A pair of pins 138 and 139 extending downwardly from the top disc 124 within the circular wall 127 engage corresponding pins 140 and 141 extending upwardly from the base disc 119 to limit the angular rotation of the top part 118 relative to the base part 117. In this embodiment of the invention, 90° of relative rotation between the top part 118 and the base part 117 is permitted. This facilitates relative rotational movement between the reel spindles of the video unit.

The pin 138 engages the pin 140 when the top part rotates in the direction of the arrow D relative to the base part 117 while the pin 139 engages the pin 141 on the top part 118 rotating in the reverse direction relative to the base part 117. A limited degree of relative movement between the two reel spindles, namely, the feed reel spindle and the take-up reel spindle is provided to simulate the type of movement which would normally be provided for a tape cassette. In this way, the cleaning device simulates a tape cassette to the maximum extent possible.

In normal operation of the cleaning device 1, the gear 135 remains stationary during rotation of the secondary rotatable member 101. In other words, the base part 117 and top part 118 rotate together, while the gear 135 remains in a stationary position relative to the housing 2. However, in the event that the video unit should go into the shutdown mode, thereby causing the feed reel spindle to rotate rapidly for taking up of the video tape in a video tape cassette, a pawl 144 pivotally mounted on the pin 140 co-operates with a ratchet gear 145 internally on the gear 135 to cause the gear 135 to rotate with the secondary rotatable member 101 as the secondary rotatable member 101 is being rotated by the feed reel spindle in the direction of the arrow E. Portion of the circular wall 127 is removed to form an opening 146 to accommodate the pawl 144 engaging the ratchet gear 145. Rotation of the gear 135 with the secondary rotatable member 101 trips a trip means provided by a trip lever 147. The trip lever 127 pivots the latch member 84 into the unlatched position for enabling the return spring 46 to pivot the control member 52 into the active position for returning the carrier arm 33. The trip lever 147 and its operation is described in more detail below. The pawl 144 comprises an arm 148 extending from a tubular member 149 which pivotally engages the pin 140. An arcuate camming member 150 on the arm 148 co-operates with a cam member 151 extending downwardly from the top disc 124, which engages an inner camming surface 152 of the camming member 150 so that as the base part 117 is rotated in the direction of the arrow E relative to the top part 118, the action of the cam member 151 on the camming member 150 pivots the pawl 144 radially outwardly of the base part 118 to engage the ratchet gear 145 of the gear 135, see FIG. 31. A cam member 154 extending downwardly from the top disc 124 of the top part 118 engages an outer camming surface 155 of the camming member 150 on the pawl 144 for returning the pawl 144 radially inwardly into the base part 117 for disengaging the pawl 144 from the ratchet gear 145 for resetting the pawl 144 for the next cleaning operation after the gear 135 has tripped the trip lever 147, see FIG. 32. The cam member 154 resets the pawl 144 on further rotation of the base part 117 in the direction of the arrow E relative to the top part 118. In FIGS. 31 and 32, for convenience, the secondary rotatable members have been illustrated with the top part 118 removed. However, to illustrate the operation of the pawl 144, the cam member 151 and the cam member 154 are illustrated in broken lines.

A top member 157 similar to the top member 109 carries pins 158 which engage corresponding bores 159 in the central boss 120 for securing the base part 117 and the top part 18 together. The top member 157 rotatably engages the top part 118.

Referring to FIGS. 3, 7, 21 and 22, the gear train 98 comprises gear elements 162 to 165. Each gear element 162 to 165 is of injection moulded plastics material and is rotatably mounted in the interior region 3 of the housing 2. The gear element 162 is rotatable on a shaft 166 extending from the base 8, and comprises a gear 167 and a gear 168. The gear 167 is engagable with the gear 107 on the main rotatable member 100. The gear element 163 is rotatable on a shaft 169 and comprises gears 170 and 171. The gear 170 is engagable with the gear 168 of the gear element 162. The gear element 164 is rotatable and axially slidable on a tubular shaft 173 extending from the base, as will be described below, and comprises gears 174 and 175. The gear 174 is engagable with the gear 171 of the gear element 163. The gear 175 is engagable with a gear 179 extending partly around the periphery of the timing wheel 94 for driving the timing wheel 94 through the timing cycle as will be described below. The gear element 165 is rotatable on a shaft 176 and comprises gears 177 and 178. The gear 177 is driven by the gear 174 of the gear element 164. The gear 178 engages the gear 130 on the secondary rotatable member 101 for driving the secondary rotatable member 101. The teeth of the gears 167 and 178 of the gear elements 162 and 165, respectively, are considerably relieved to accommodate radial movement of the main and secondary rotatable members 100 and 101. Similarly, the gears 107 and 130 on the main and secondary rotatable members 100 and 101, respectively, are similarly considerably relieved to further accommodate the relative radial movement of the rotatable members 100 and 101 in the openings 22 and 23. In fact, in this embodiment of the invention, + or − 1.4 mm of radial movement is provided for the main rotatable member 100 about its rotational axis and a similar degree of radial movement, namely + or − 1.4 mm of radial movement is provided for the secondary rotatable member 101 about its rotational axis. Furthermore, the fact that the teeth of the gears 107, 130, 167 and 178 are relieved provides substantial backlash between the main rotatable member 100 and the secondary rotatable member 101, thereby allowing some reverse rotation of one of the rotatable members relative to the other before the rotatable members 100 and 101 and the gear train 98 lock. This facilitates some reverse rotation of the feed reel spindle relative to the take-up reel spindle of the video unit. This is to simulate the type of movement which would normally be provided for in a tape cassette, so that the cleaning device simulates a tape cassette to the maximum extent possible. However, as mentioned above, reverse rotation of the reel spindles of the video unit relative to each other is also provided for by the construction of the secondary rotatable member 101, which has already been described. Furthermore, the gear train 98 and rotatable members 100 and 101 ar arranged so that either one of the rotatable members may drive the other rotatable member. As can be seen, the transmission means comprising the gear train 98 and the rotatable members 100 and 101 is provided wholly within the interior region 3 of the housing 2, and furthermore, in this embodiment of the invention, the transmission means is also non-engagable with guide rollers of the video unit.

Figure 21:
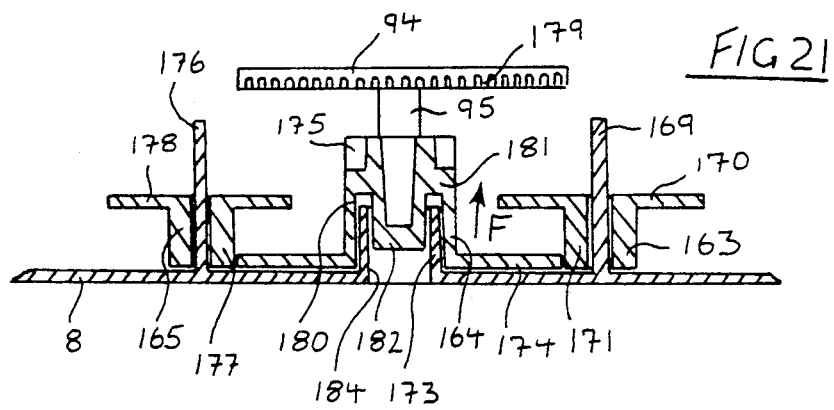
FIG. 21 is an elevational view of portion of the device of FIG. 1.
Figure 22:
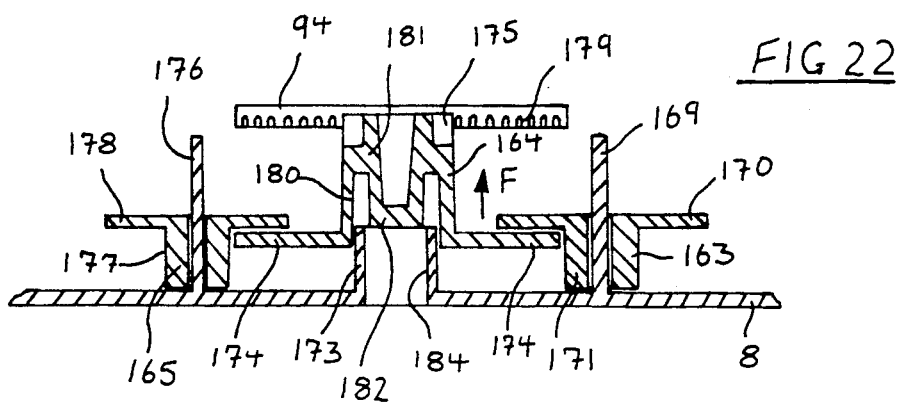
FIG. 22 is an elevational view of the portion of the device of FIG. 21 illustrated in a different position.

Returning now to the gear element 164, and referring in particular to FIGS. 21 and 22, a bore 180 extends into the gear element 164 which is closed at the end 181. The bore 180 rotatably and slidably engages the tubular shaft 173 so that the gear element is axially slidable on the shaft 173 in the direction of the arrow F from a disengaged position illustrated in FIG. 21 to an engaged position illustrated in FIG. 22. In the disengaged position, the gear 175 is disengaged from the gear 179 on the timing wheel 94, and accordingly, the timing wheel 94 is disengaged from the gear train 98 and the remainder of the transmission means to facilitate setting of the timing wheel 94. In the engaged position, the gear 175 engages the gear 179 on the timing wheel 94, thereby the timing wheel 94 is driven by the gear train 98. A spigot 182 extends from the closed end 181 into the bore 180 of the gear element 164, and in turn, into a bore 184 of the tubular shaft 173. The bore 184 through the tubular shaft 173 extends through the base 8 and accommodates the reel brake release post of the video unit for engaging the spigot 182 as the device 1 is engaging in the cassette receiving area for sliding the gear element 164 in the direction of the arrow F into the engaged position with the gear 175 engaging the gear 179 on the timing wheel 94. The gears 171 and 177 on the gear elements 163 and 165, respectively, are of relatively long axial length, so that the gear 174 remains in engagement with the gears 171 and 177 as the gear element 164 slides on the tubular shaft 173 from the disengaged to the engaged position and vice versa.

The timing wheel 94 and its operation will now be described with reference in particular to FIGS. 3 to 6, where the timing wheel 94 is illustrated in different positions in the timing cycle. During a timing cycle, the timing wheel 94 is driven through approximately 90° in the direction of the arrow K by the gear 175 from the set position illustrated in FIGS. 2 and 3 to the timed out position illustrated in FIGS. 1 and 6. The timing wheel 94 is manually set by rotating the timing wheel 94 in the direction of the arrow L from the timed out position through 90° to the set position. During manual setting, the gear element 164 is in the disengaged position so that the timing wheel 94 is disengaged from the gear train 98, thereby facilitating ease of rotation and setting of the timing wheel 94.

The timing wheel comprises means for timing a predetermined delay period and means for timing a predetermined treatment period, in this case, a predetermined cleaning period. The delay period and cleaning period are sequentially timed. During the delay period, the carrier arm 33 is retained in the rest position to facilitate movement of the tape control mechanism of the video unit, for example, the tape guide rollers and tape guide arms into their normal play or record operating positions prior to cleaning. This avoids the possibility of the cleaning arm 33 or brush 31 becoming impaled on the tape control mechanism during the start up cycle of the video unit. During the cleaning period, the carrier arm 33 is pivoted into the cleaning position, and on termination of the cleaning period, the carrier arm 33 returned to the rest position.

The means for timing the delay period comprises a first camming means comprising a cam member 190 extending from the timing wheel 94, which co-operates with a second corresponding camming means, namely, a follower member 192 mounted on the secondary arm 55 of the linkage arm 48. The follower member 192 is in engagement with the cam member 190 during the delay period for retaining the linkage arm 48 in the position illustrated in FIG. 3, and in turn the carrier arm 33 in the rest position. The cam member 190 terminates at one end in an abutment member 191 for engaging the follower member 70 on the radial arm 66 for pivoting the control member 52 into the inactive position as the timing wheel 94 is being rotated into the set position. The latch member 84 as will be described below is pivoted by the timing wheel 94 during setting of the timing wheel 94 to engage the control member 52 and retain the control member 52 in the inactive position. As well as retaining the linkage arm 48 in the position illustrated in FIG. 3 during the delay period, the cam member 190 also retains the linkage arm 48 and in turn the carrier arm 33 in the rest position while the control member 52 is being moved into the inactive position during setting of the timing wheel 94. On the timing wheel 94 having rotated from the set position into the position illustrated in FIG. 5, the delay period has been timed, and the cam member 190 disengages the follower member 192. With the control member 52 retained in the inactive position, the linkage arm 48 is free to pivot under the action of the drive spring 45 in the direction of the arrow A, which in turn pivots the carrier arm 33 into the cleaning position. The timing wheel 94 continues to be rotated by the gear train 98 to time the cleaning period.

Before describing the cleaning period of the cycle, the setting action of the timing wheel 94 on the latch member 84 will be described. An abutment member 193 extending downwardly from the timing wheel 94 engages a first camming surface 194 on a first camming member 195 adjacent the free end of the latch member 84 for pivoting the latch member 84 towards the central boss 65 of the control member 52 as the timing wheel 94 is rotated into the set position. On the timing wheel 94 reaching the set position, the control member 52 is pivoted into the inactive position and the tooth 89 extending from the central boss 65 of the control member 52 is aligned and engaged in the slot 88 in the latch member 84. Accordingly, the control member 52 is latched and retained in the inactive position by the latch member 84.

The means for timing the cleaning period comprises a third camming means, in this case, an abutment member 200 extending from the timing wheel 94 at the end of the cam member 190. The abutment member 200 co-operates with a corresponding fourth camming means on the latch member 84 which is formed by a second camming surface 201 of the first camming member 195 for pivoting the latch member 84 in the direction of the arrow N into the unlatched position with the tooth 89 disengaged from the slot 88. Just before the timing wheel 94 rotates into the timed out position illustrated in FIG. 6, the abutment member 200 engages the second camming surface 201 of the first camming member 195. Further rotation of the timing wheel 94 towards the timed out position of FIG. 6 pivots the latch member 84 in the direction of the arrow N into the unlatched position. The control member 52 is thus free to pivot and is pivoted from the inactive position into the active position under the action of the return spring 46. The action of the follower member 70 on the camming member 71 of the linkage arm 48 pivots the linkage arm 48 in the direction of the arrow B, thereby returning the carrier arm 33 into the rest position.

A camming surface 196 on a second camming member 197 on the latch member 84 engages the abutment member 193 on the timing wheel 94, as the timing wheel 94 commences to time a timing cycle for ensuring that the latch member 84 is retained in the latched position with the tooth 89 and slot 88 engaged. The second camming member 197 is resiliently mounted relative to the latch member 84 on a resilient tongue 198 extending into a slot 199 in the latch member 84, see FIG. 16. This permits the second camming member 197 to be depressed downwardly through the slot 199 to facilitate passage of the abutment member 193 over the camming member 197 as the timing wheel 94 is being rotated into the set position. A lead-in 202 is provided on the second camming member 197 to facilitate passage of the abutment member 193 over the second camming member 197. On the timing wheel 94 being rotated into the set position, the latch member 84 is pivoted into position with the tooth 89 engaged in the slot 88, and in this position, the abutment member 193 is aligned with the camming surface 196 of the second camming member 197. Accordingly, as the timing wheel commences to time a timing cycle, the abutment member 193 bears along the camming surface 196 of the second camming member 197. The length of the second camming member 197 is such that the abutment member 193 remains in engagement with the camming surface 196 until just after the cam member 90 has disengaged the follower member 192 and until the linkage arm 48 has pivoted the carrier member 33 into the cleaning position. Accordingly, any danger of the latch member 84 disengaging the control member 52 as a result of vibration or shock while the linkage arm 48 is pivoting the carrier arm 33 into the cleaning position is avoided.

Figure 28:
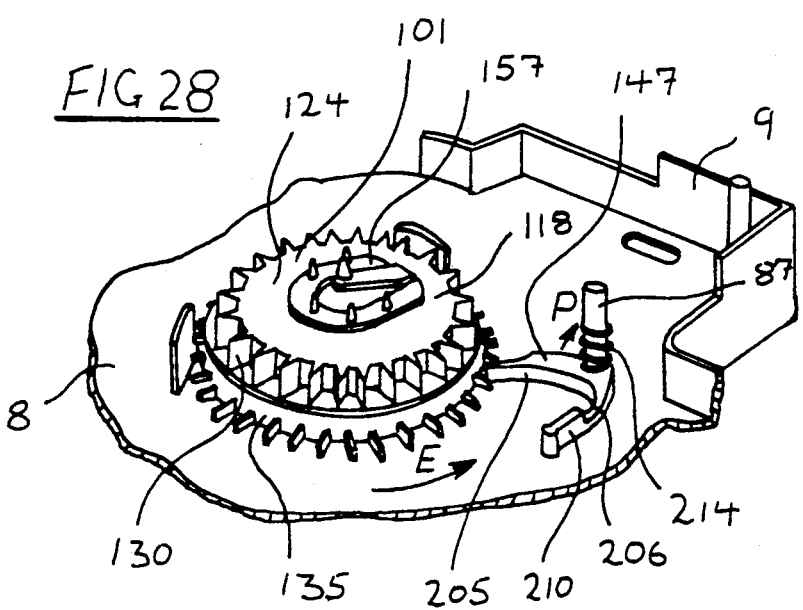
FIG. 28 is a perspective view of another portion of the device of FIG. 1.
Figure 4:
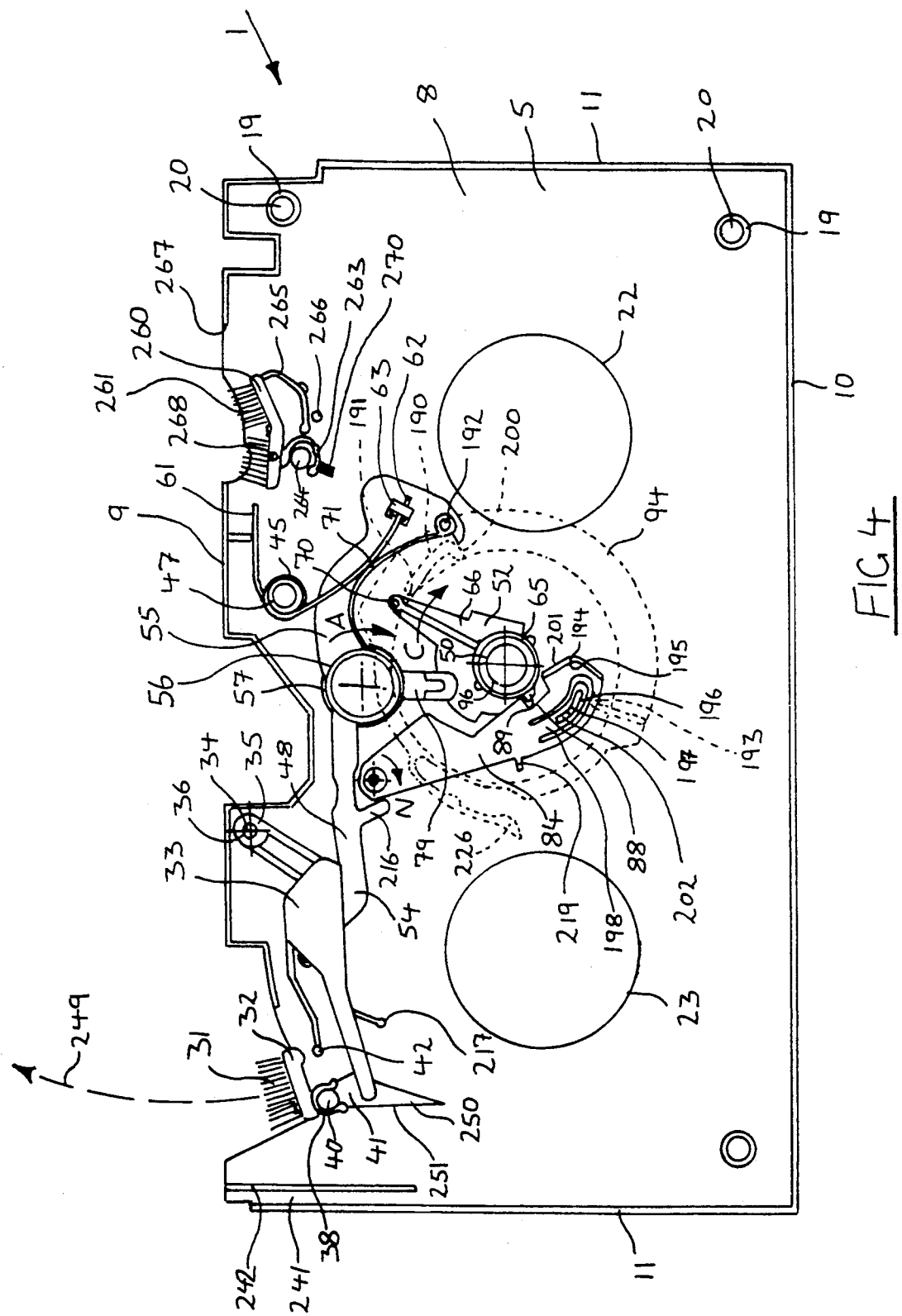
FIG. 4 is a plan view similar to FIG. 3 with further portions of the device removed.
Figure 11:
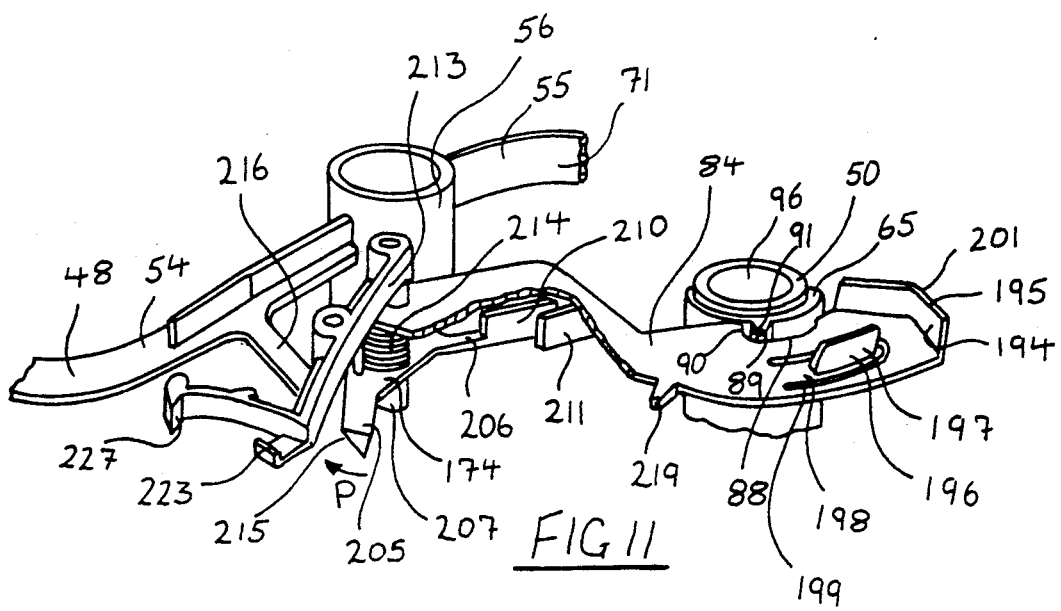
FIG. 11 is a perspective view of portion of the detail of FIG. 10.
Figure 12:
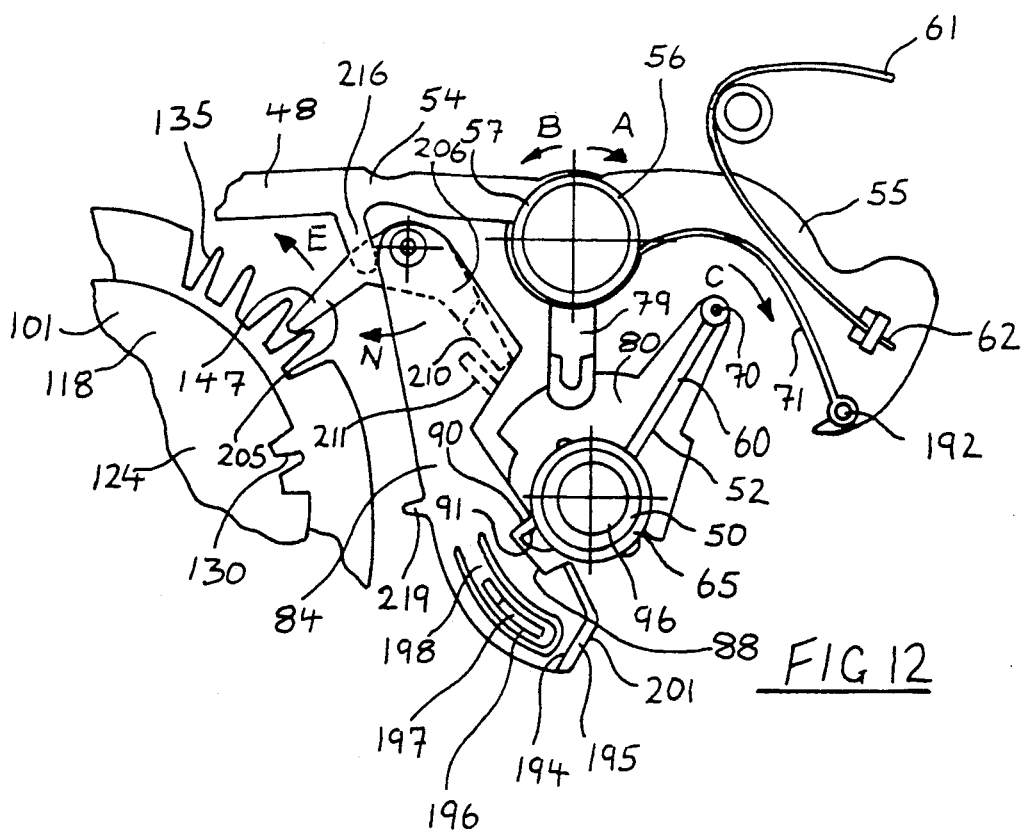
FIG. 12 is a plan view of portion of the device of FIG. 1.

Referring now in particular to FIGS. 11, 12 and 28, the trip lever 174 comprises a trigger arm 205 and a trip arm 206 extending from a boss 207. The trip lever 147 is responsive to a change in state of the video unit for returning the carrier arm 33 to the rest position. In this embodiment of the invention, the trip lever 147 is responsive to the video unit going into a shutdown mode. A bore (not shown) through the boss 207 pivotally and slidably engages the pivot shaft 87. The trip arm 206 carries a lug 210 engagable with a corresponding lug 211 extending from the latch member 84. The trigger arm 205 is engagable with the gear 135 so that on rotation of the gear 135 in the direction of the arrow E the trip lever 147 is pivoted in the direction of the arrow P, and accordingly, the lugs 210 and 211 co-operate to pivot the latch member 84 into the unlatched position disengaged from the control member 52. This permits the control member 52, under the action of the return spring 46 to pivot the linkage arm 84 in the direction of the arrow B for returning the carrier arm 33. A compression spring 214 on the pivot shaft 87 acting against the latch member 84 urges the trip lever 147 towards the base 8 so that the trigger arm 205 is in engagement with the gear 135. An engagement surface 215 on the trigger arm 205 cooperates with a camming member 216 extending from the linkage arm 48 so that when the carrier arm 33 is in the rest position, the camming member 216 engages the engagement surface 215, and urges the trip lever 147 upwardly along the pivot shaft 209 against the action of the spring 214 for disengaging the trigger arm 205 from the gear 135. This prevents operation of the trip lever 147 when the carrier arm 33 is in the rest position. On the carrier arm 33 moving into the cleaning position, the camming member 216 disengages the trigger arm 205, and the action of the spring 214 urges the trip lever 147 downwardly towards the base 8, and accordingly, the trigger arm 205 is brought into engagement with the gear 135.

A tongue 217 extending from the linkage arm 48 engages the gear 135 of the secondary rotatable member 101 when the linkage arm 48 and carrier arm 33 are in the rest position, thereby preventing rotation of the gear 135 while the carrier arm 33 is in the rest position. This facilitates resetting and disengagement of the pawl 144 from the ratchet gear 145 as the secondary rotatable member 101 is rotated by the main rotatable member 100 at the beginning of a timing cycle. The secondary rotatable member 101 is rotated in the direction of the arrow E through the gear train 98 by the main rotatable member 100 under the action of the take-up reel spindle when the video unit is put into the play mode. Resetting of the pawl 144 in this way is only necessary where the pawl 144 fails to fully disengage the ratchet gear 145 after the trip lever 147 has been tripped by the gear 135.

Stop means for stopping rotation of the feed reel spindle when the timing wheel 94 has timed out, in other words, when the timing wheel 94 has reached the end of its timing cycle, comprises a stop member 219 extending from the latch member 84. The stop member 219 is engagable with the gear 130 on the secondary rotatable member 101 on the latch member 84 being pivoted into the unlatched position by the abutment member 200 engaging the first camming member 195. On the stop member 219 engaging the gear 130 of the secondary rotatable member 101, rotation of the secondary rotatable member 101 is prevented. This, accordingly, stops the feed reel spindle rotating, which in turn causes the video unit to go into a shutdown mode.

In this embodiment of the invention, the carrier arm 33 is mounted to be pivotal in a clockwise direction from the rest position to the cleaning position when viewed from above. Further, the carrier arm 33 on pivoting from the rest position to the cleaning position moves the cleaning brush 31 in an arcuate path indicated by the broken lines 249, see FIGS. 3 to 6.

Engagement means for engaging a component of the tape control mechanism, for example, a guide roller or the like in the video unit for returning the carrier arm 33 to the rest position in the event of the video unit going into a shutdown mode while the carrier arm is in the cleaning position is provided. The engagement means comprises an engagement member 250 extending from the carrier arm 33. The engagement member 250 comprises an engagement surface 251 for engaging the component. The engagement surface 251 extends from a position substantially adjacent the carrier member 32 rearwardly and outwardly of the direction of forward motion of the brush 31 from the rest position to the cleaning position. Thus, the engagement surface 251 is arranged to engage a tape guide roller or the like prior to the tape guide roller becoming impaled between the carrier member 32 and the carrier arm 33.

Figure 8:
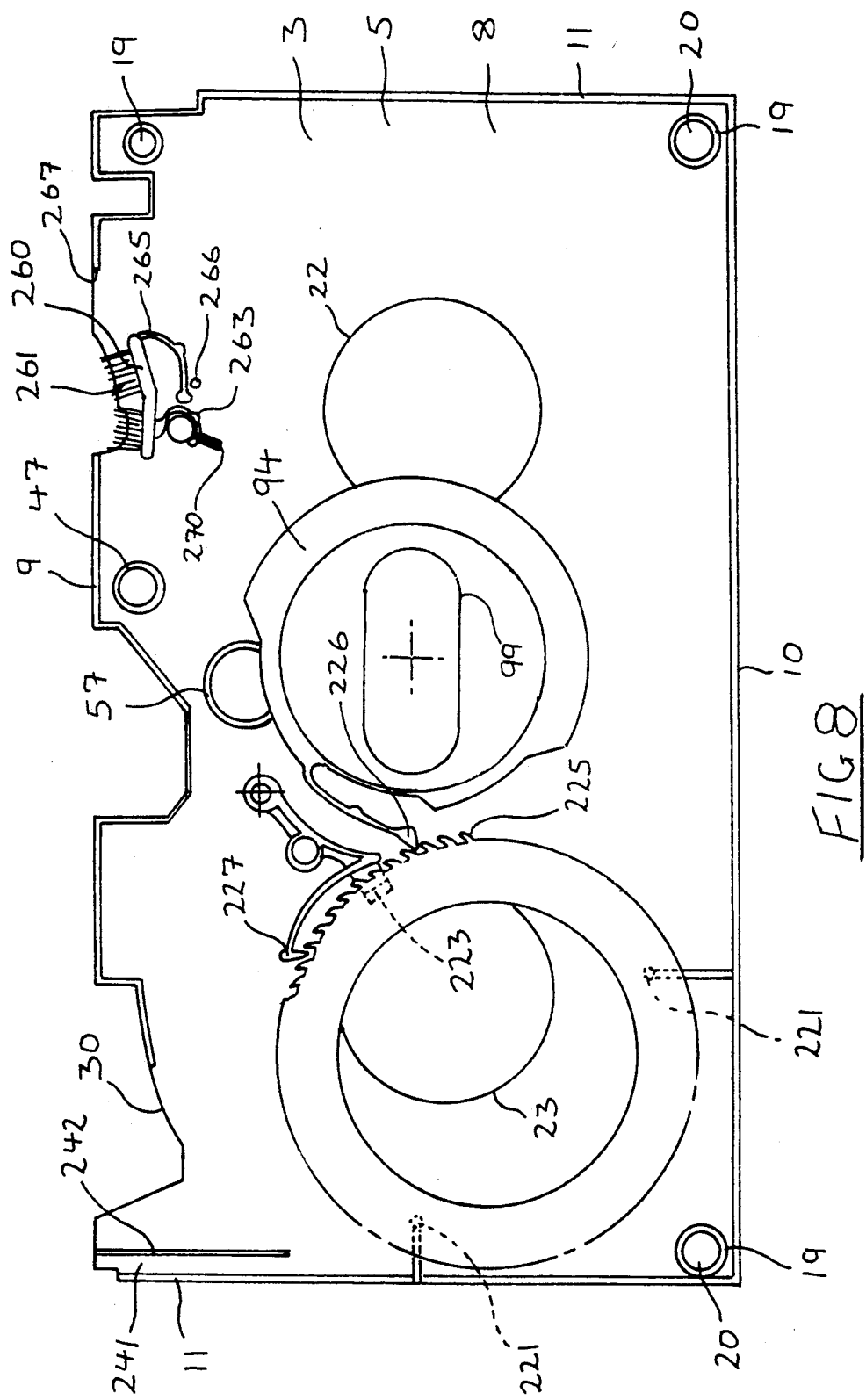
FIG. 8 is a plan view similar to FIG. 3 with different components of the device removed.

A ring member 220 for recording the number of times the cleaning device 1 is used is rotatably mounted in the interior region 3 of the housing 2 on a pair of mounting pins 221 which extend from the base 8, and on a bearing member 223 on the mounting member 213, see FIGS. 3 and 8. The mounting pins 221 and the mounting member 213 slidably engage an annular groove extending around the underside of the ring member 220. A ratchet gear 225 provided around the periphery of the ring member 220 co-operates with a pawl 226 extending from the timing wheel 94 so that each time the timing wheel 94 is set, the ring member 220 is rotated through an increment corresponding to one tooth of the ratchet gear 225. A stop member 227 on the mounting member 213 engages the ratchet gear 225 to prevent reverse rotation of the ratchet gear 220. A plurality of digits (not shown) corresponding to each time the cleaning device 1 is used are provided on the ring member 220. The digits are sequentially visible through a slot 228 in the top wall 14 of the housing 2 to indicate to a user the number of times the cleaning device 1 has been used.

The digits (not shown) are positioned at angular intervals around the ring member 220 corresponding to respective teeth of the ratchet gear 225. It is envisaged that various instruction symbols may be provided on the ring member 220 to indicate to a user, for example, that the brush 31 requires cleaning or replacing or the like.

Returning to the brush 31, and referring in particular to FIGS. 19 and 20, the brush 31 is releasably mounted in the carrier member 32. The brush 31 comprises a base 230 of a reasonably rigid fabric material, and a plurality of bristles 231 extending from the base 230. The carrier plate 37 is formed in two halves 232 and 33. Dowels 234 extending from the half 232 engage corresponding bores (not shown) in the half 233 for releasably securing the halves 232 and 233 together. A lip 236 extends round the periphery of the carrier plate 37 and defines a groove 237 for engaging and retaining the base 230 of the brush 31. To replace a brush 31, the halves 232 and 233 are separated to remove the brush 31 which is replaced by a new brush 31, and the halves 232 and 233 are secured together by the dowels 234. In this embodiment of the invention, the diameter of the bristles 231 are such as to facilitate entry of the bristles between grooves, slots and the like in the video drum and video head.

Referring in particular to FIGS. 1, 2 and 33, a retaining means comprising a retaining member 240 is provided for engaging the tensioning arm of the video unit which operates the clutch of the feed reel spindle. The retaining member 240 is operable by the cover 25 and is slidable in a groove 241 from a disengaged position within the interior region 3 of the housing 2 to an engaged position extending outwardly of the housing 2, as illustrated in FIG. 33, for engaging the tensioning arm, as the cover 25 is opened on the cleaning device being engaged in the cassette receiving area of a video unit. The groove 241 is formed by one of the side walls 11 of the lower part 5 of the housing 2 and a wall 242 extending upwardly from the base 8. An arm 245 extending from one of the pivot pins 26 of the cover 25 engages a recess 243 formed in the retaining member 240 for sliding the retaining member in the groove 241 as the cover 25 is pivoted. Accordingly, on the cleaning device 1 being engaged in the cassette receiving area of the video unit, the retaining member 240 is moved outwardly of the housing 2 into the engaged position for engaging the tensioning arm of the video unit, and thus prevent movement of the tensioning arm. In some video units, it is necessary to retain this tensioning arm from moving in order to prevent operation of the clutch of the feed reel spindle.

A carrier member 260 releasably carries a brush 261 for cleaning the capstan and pinch roller of the video unit, see FIGS. 2, 34 and 35. An opening 267 in the front wall accommodates the carrier member 260 and the brush 261. The carrier member 260 is of injection moulded plastics material and comprises a main plate member 262. A clip 263 extending rearwardly from the main plate member 262 releasably, pivotally and slidably engages a pivot shaft 264 extending from the base 8. A resilient member 265 extending from the main plate member 262 slidably abuts an abutment member 266 for biasing the carrier member 260 and in turn the brush 261 into engagement with the capstan and pinch roller of the video unit. A pin 268 extending upwardly from the carrier member 260 slidably bears on the top wall 14 of the housing 2 and urges a pin 269 extending from the clip 263 against the base 8. The pin 269 co-operates with a stop member 270 on the base 8 to prevent excessive pivoting of the carrier member 260 in the direction of the arrow R. The stop member 270 is ramp shaped at 271 so that as the carrier member 260 pivots in the direction of the arrow R the carrier member 260 slides upwardly on the pivot shaft 264. Thereby the brush 261 is wiped along the capstan and pinch roller of the video unit, which further improves the cleaning action of the brush 261. Grooves 272 formed by lips 273 extending from the main plate member 262 engage and releasably retain the brush member 261 in the carrier member 260. The brush 261 is of substantially similar construction to the brush 31 already described and may be removed for cleaning or replacing when worn.

In use, a suitable solvent or cleaning fluid is applied to the brush 31 and the brush 261. Indeed, if desired, the cleaning device 1 may be used without using a solvent or cleaning fluid. The timing wheel 94 is set by manual rotation through approximately 90° from the timed out position to the set position. During the setting of the timing wheel 94, as described already, the gear element 164 is disengaged from the timing wheel 94, thereby facilitating ease of rotation of the timing wheel 94. On rotation of the timing wheel 94 into the set position, the control member 52 is rotated into the inactive position and the latch member 84 is pivoted into the latched position so that the tooth 89 and slot 88 engage, thereby retaining the control member 52 in the inactive position. Further, as the timing wheel 94 is being rotated between the position illustrated in FIG. 5 and the set position into the set position, the cam member 190 on the timing wheel 94 engages the follower member 192, thereby retaining the linkage arm 48 and the carrier arm 33 in the rest position.

On the timing wheel 94 being set, the cleaning device 1 is ready for use. The cleaning device 1 is then entered into the cassette receiving area of a video unit, the video drum and video head of which are to be cleaned. The cleaning device 1 is entered into the video unit in similar fashion to a video tape cassette. On entering the cassette receiving area, the cover 25 is pivoted into the open position, see FIG. 2, as would normally happen with the corresponding cover of a video tape cassette. The arm 245 extending from the pivot pin 26 of the cover 25 slides the retaining member 240 outwardly relative to the housing 2 into the engaged position for engaging and retaining the tensioning arm of the video unit which operates the clutch of the feed reel spindle in its shutdown position. Further, on the cleaning device 1 engaging in the cassette receiving area of the video unit, the reel brake release post of the video unit enters the bore 174 of the tubular shaft 173 and engages the spigot 182 of the gear element 164. The reel brake release post slides the gear element 164 upwardly on the tubular shaft 73, and in turn, engages the gear 175 with the gear 179 on the timing gear 94. The play button of the video unit is operated to put the video unit into a play mode. The take-up reel spindle of the video unit commences to rotate, thereby driving the gear train 98 which in turn rotates the secondary rotatable member 101 and in turn the feed reel spindle of the video unit. The gear train 98 also rotates the timing wheel 94 from the set position to the timed out position. The timing wheel 94 commences to time a predetermined delay period, which delays movement of the carrier arm 33 into the cleaning position. This permits the tape guide rollers and tape guide arms of the tape control mechanism of the video unit to take up their normal operating position prior to the carrier arm 33 being pivoted into the cleaning position. On the timing wheel 94 rotating to a position illustrated in FIG. 5 where the cam member 190 disengages the follower member 192 on the linkage arm 48, the linkage arm 48 is pivoted by the drive spring 45 in the direction of the arrow A, thereby pivoting the carrier arm 33 and the brush 31 into the cleaning position with the brush 31 in cleaning engagement with the drum and video head of the video unit. As the drum rotates, the brush 31 cleans the drum and the video head. On the timing wheel 94 rotating to its timed out position, see FIG. 6, the abutment member 200 engages the first camming member 195 of the latch member 84, thereby pivoting the latch member 84 into the unlatched position, and disengaging the latch member 84 from the control member 52. The return spring 46 thus pivots the control member 52 into the active position, thereby pivoting the linkage arm in the direction of the arrow B to return the carrier arm 33 to the rest position. Additionally, on the timing wheel 94 having timed out, the stop member 219 on the latch member 84 engages the gear 130 of the secondary rotatable member 101, thereby preventing further rotation of the secondary rotatable member 101 and in turn stopping rotation of the feed reel spindle of the video unit. This puts the video unit into a shutdown mode and switches off the video unit. The cleaning device is removed by activating the eject button of the video unit.

Also on the cover 25 pivoting into the open position as the cleaning device 1 is being engaged in the cassette receiving area of the video unit, the cleaning brush 261 is exposed and brought into engagement with the capstan and pinch roller. The cleaning brush 261 cleans the capstan and pinch roller as they rotate against the brush.

Should the video unit go into a shutdown mode while the cleaning arm 33 is in the cleaning position, the cleaning arm 33 is returned to the rest position by the action of the trip lever 147. On the feed reel spindle commencing to rotate to take up tape, as it would in the shutdown mode, the base part 117 of the secondary rotatable member 101 is rotated relative to the top part 118 in the direction of the arrow E. This causes the pawl 144 to engage the ratchet gear 145 of the gear 135 and to rotate the gear 135 in the direction of the arrow E with the secondary rotatable member 101. The gear 135 trips the trip lever 147 which pivots the latch member 84 into the unlatched position out of engagement with the control member 52. The control member 52 is pivoted into the active position under the action of the return spring 46, and the carrier arm 33 is returned to the rest position. It is important that the length of the second camming member 197 should be such that almost immediately after the carrier arm 33 has pivoted into the cleaning position, the abutment member 193 disengages the second camming member 197 to permit the trip lever 147 to pivot the latch member 84 into the unlatched position in response to rotation of the gear 135.

Additionally, if for any reason the video unit should go into the shutdown mode, and the cleaning arm 33 is still either in the cleaning position or in a position intermediate the cleaning position and the rest position, the carrier arm 33 is returned to the rest position by the action of a tape guide roller of the video unit on the engagement member 250.

Each time the timing wheel 94 is rotated into the set position, the ring member 220 is advanced one increment by the pawl 226 engaging the ratchet gear 225, thereby counting the number of cleaning cycles which have been carried out by the cleaning device.

While a particular construction of timing means has been described, any other suitable timing means may be used. It will of course be appreciated that while it is preferable, it is not essential that the timing means should be responsive to rotation of the take-up reel spindle, nor indeed, need the timing means be responsive to rotation of the feed reel spindle. Indeed, in certain cases, it is envisaged that the timing means may be timed independently of the operation of the video unit. It will also of course be appreciated that while it is preferable, it is not essential that a gear train be provided to cause the feed reel spindle to rotate as the take-up reel spindle rotates. Further, while the transmission means has been described as comprising a gear train, any other suitable transmission means may be used. Further, it will be appreciated that while it is preferable it is not essential that a trip means be provided for tripping of the latch means, and where a trip means is provided, any other suitable trip means besides a trip lever may be used.

It will of course be appreciated that other suitable construction of main and secondary rotatable members may be used for engaging the take-up and feed reel spindles.

Needless to say, while the cleaning means has been described as comprising a cleaning brush for cleaning the video drum and video head, any other suitable cleaning means, for example, a pad or the like may be used. It will also of course be appreciated that while the cleaning means has been described as being pivotally mounted on the carrier arm, any other suitable mounting means may be used, and indeed, in certain cases, it is envisaged that the cleaning means may not be pivotally mounted on the carrier arm.

It will of course be appreciated that in certain cases the linkage arm may be dispensed with. In which case, the drive means would drive the carrier arm directly or through another suitable linkage means.

While a particular construction of latch means has been described, any other suitable construction of latch means may be provided, and in certain cases, the latch means may be dispensed with.

While the drive means has been described as comprising a drive spring and a return spring, any other suitable drive means may be used. Indeed, it is envisaged that in certain cases one drive means may be provided for driving and returning the carrier arm. Indeed, in certain cases, it is envisaged that the drive means may be derived from the take-up and/or feed reel spindles.

While the device has been described as comprising a cleaning brush for cleaning a capstan and pinch roller, this may be dispensed with if desired.

While the cleaning device has been described as comprising a housing, which defines a hollow interior region, while this is preferable, it is not essential. In certain cases, it is envisaged that all that need be provided is a support member for supporting the various components of the cleaning device.

While the cleaning device has been described for cleaning the video drum and video head of a video unit, the device may be used for carrying out many other treating functions of the video unit. For example, the device may be used for polishing the video drum and/or video head, buffing the drum and/or video head, or any other desired treatment operations.

Further, while the device has been described for use with a VHS video unit, it could be used with any other video unit, for example, a BETA MAX unit.

Furthermore, it will be appreciated that the device according to the invention may be used for cleaning or treating in any other way a moving head and/or drum of any playback and/or recording unit, for example, the device may be used for treating or cleaning a moving head and/or drum of, for example, a mass data back-up storage recording and/or playback unit, an eight millimetre RV-2000 recording and/or playback unit, a camcorder, a digital audio tape recording and/or playback unit, a data back-up recording and/or playback unit for computer data, or any other such recording and/or playback unit, device or apparatus. Further, the device according to the invention may be used for treating and/or cleaning a moving head or drum of any other helical scan device.

Indeed, the uses to which the device according to the invention may be put are almost limitless.

In certain recording and/or playback units, a single reel spindle only is provided in the cassette receiving area of the unit. In such cases, it is envisaged that the transmission means of the device according to the invention may be adapted to engage the single reel spindle. Indeed, in other cases, the transmission means may be dispensed with. Furthermore, in general, it is envisaged that the housing of the device according to the invention will be shaped to suit the cassette receiving area of the recording and/or playback unit with which the treatment device is to be used.

Needless to say, the trip means may be responsive to other changes in state of the video unit besides the video unit going into a shutdown mode.

Further, while the engagement member 250 has been described as being of a particular shape and construction, engagement members where they are provided may be of any other suitable or desired shape. Needless to say, the engagement member may be dispensed with.

While a ring member has been described for counting the number of times the cleaning device has been used, any other suitable means for counting the number of uses may be provided. Indeed, if desired, the ring member may be dispensed with, and it will be appreciated that it is not necessary to provide a means for counting the number of times the cleaning device has been used.

Further, while it is preferable, it is not essential that the stop means be provided for putting the video unit into a shutdown mode on the carrier arm having returned to the rest position. In fact, in certain cases, it is envisaged that the stop means may be dispensed with altogether. Where such stop means are provided, a stop means other than the stop member 219 may be provided, and indeed, the stop means may be mounted on any other component of the device besides the latch member.

What is claimed is:

1. A device for treating a moving head and/or drum of a playback and/or recording unit, the unit being of the type comprising a receiving area for receiving a cassette, and having at least one rotatable reel spindle in the cassette receiving area for engaging a tape reel in a cassette, the device comprising:

a main support member releasably engagable in the cassette receiving area of the unit, a treatment means for cleaning, polishing or buffing the head and/or drum, a carrier arm for carrying the treatment means, the carrier arm being mounted on the main support member and being movable from a rest position with the treatment means spaced apart from the head and/or drum, in use, to a treating position with the treatment means engaging the head and/or drum, timing means mounted on the main support member for timing at least a delay period greater than zero, and drive means for moving the carrier arm from the rest position to the treating position, the drive means being responsive to the timing means for moving the carrier arm to the treating position after the timing means has timed the delay period.

2. A device as claimed in claim 1 in which the timing means times a delay period of predetermined time.

3. A device as claimed in claim 1 further comprising transmission means operatively coupled with the timing means, the transmission means being operably engagable with one of the reel spindles of the unit.

4. A device as claimed in claim 3 in which the timing means is responsive to rotation of the said one of the reel spindle of the unit for causing the timing means to time the delay period.

5. A device as claimed in claim 3 in which the transmission means is engagable with a take-up reel spindle of the unit.

6. A device as claimed in claim 1 in which the timing means further comprises means for timing a treatment period after the delay period has been timed, and the drive means comprises means responsive to the timing means for returning the carrier arm to the rest position upon the timing means having timed the treatment period.

7. A device as claimed in claim 6 in which the timing means times a treatment period of predetermined length.

8. A device as claimed in claim 6 in which the timing means times a timing cycle, the timing cycle comprising the delay period and the treatment period.

9. A device as claimed in claim 8 in which the timing means commences timing the timing cycle from a set position to a timed out position, and sequentially times the delay period and the treatment period, the timing means being settable from the timed out position to the set position.

10. A device as claimed in claim 9 further comprising means for disengaging said timing means from the transmission means to facilitate setting of the timing means from the timed out position to the set position.

11. A device as claimed in claim 9 in which the timing means comprises a timing member, the timing member being rotatably mounted on the main support member and being operably engagable with and drivable by the transmission means from the set position for commencing the timing cycle to a timed out position, having timed the timing cycle, the means for timing the delay period and the treatment period comprising a camming means co-operable with the drive means.

12. A device as claimed in claim 6 in which the drive means comprises a first drive means for moving the carrier arm from the rest position to the treating position and a second drive means for returning the carrier arm from the treating position to the rest position.

13. A device as claimed in claim 12 in which the first and second drive means comprise a drive spring and a return spring, respectively.

14. A device as claimed in claim 12 in which a control member is pivotally mounted on the main support member and is operatively connected to the carrier arm, the control member being movable from an inactive position to an active position by the second drive means for returning the carrier arm to the rest position, the control member being movable by the timing member into the inactive position on the timing member being moved into the set position, latch means being provided for retaining the control member in the inactive position, the latch means being engagable with the camming means on the timing member for moving the latch means into an unlatched position for releasing the control member on the timing member having timed out.

15. A device as claimed in claim 9 in which stop means for stopping rotation of one of the reel spindles for putting the unit into a shutdown mode is provided, the stop means being responsive to the timing means having timed out.

16. A device as claimed in claim 1 in which the treatment means comprises a cleaning means for cleaning the head and/or drum, and the cleaning means is pivotally mounted on the carrier arm.

17. A device as claimed in claim 1 in which the main support member is formed by part of a housing, the housing defining a hollow interior region, the carrier arm being pivotally mounted in the housing, and being pivotal from the rest position substantially within the interior region of the housing to the treating position extending substantially out of the housing.

18. A device as claimed in claim 1 in which trip means is mounted on the main support member for activating the drive means for returning the carrier arm to the rest position, the trip means being responsive to a change in sate of the unit.

19. A device as claimed in claim 18 in which the trip means is responsive to one of the reel spindles commencing to rotate, or to rotate in a different mode or speed.

20. A device as claimed in claim 1 in which a cover member is pivotally mounted in the main support, and a retaining means is mounted on the main support member, the retaining means being movable from a disengaged position to an engaged position for engaging and retaining a tensioning arm of the unit which operates a clutch of one of the reel spindles, the retaining means being co-operable with the cover member so that on pivoting of the cover member on the main support member being engaged int he cassette receiving area of the unit the retaining means is moved into the engaged position.

21. A device as claimed in claim 3 in which the
    transmission means interconnects the feed reel spindle and the take-up reel spindle of the unit so that on rotation of at least one of the said reel spindle, the other of said reel spindles is at least partly rotated, the transmission means being provided wholly within the interior region of the housing.

22. A device as claimed in claim 21 in which the transmission means comprises a gear train comprising a plurality of operatively engaging gears rotatably mounted in the housing.

23. A device as claimed in claim 21 in which the transmission means comprises a main rotatable member and a secondary rotatable member, both rotatable members being rotatably mounted in the housing, the main rotatable member being engagable with the take-up reel spindle, and the secondary rotatable member being engagable with the feed reel spindle in the unit.

24. A device as claimed in claim 3 in which the
    transmission means interconnects the feed reel spindle and the take-up reel spindle of the unit so that on rotation of at least one of the said reel spindle, the other of said reel spindles is at least partly rotated, and
    means are provided in the transmission means for permitting rotation of the said other of said reel spindles relative to the said one of said reel spindle.

25. A device as claimed in claim 24 in which the transmission means at least partly rotates the feed reel spindle on rotation of the take-up reel spindle, and permits relative rotation of the take-up reel spindle relative to the feed reel spindle.

26. A device as claimed in claim 24 in which the transmission means is provided wholly within the interior region of the housing.

27. A device for treating a moving head and/or a drum of a playback and/or recording helical scan unit, the helical scan unit being of the type comprising a receiving area for receiving a cassette, and having at least one rotatable reel spindle in the cassette receiving area for engaging a tape reel in a cassette, the device comprising:
    a main support member releasably engagable int he cassette receiving area of the unit,
    a treatment means for cleaning, polishing or buffing the head and/or drum,
    a carrier arm for carrying the treatment means, the carrier arm being mounted on the main support member and being movable from a rest position with the treatment means spaced apart from the head and/or drum, in use, to a treating position with the treatment means engaging the head and/or drum, in use,
    timing means mounted on the main support member for timing at least a delay period greater than zero, and
    drive means for moving the carrier arm from the rest position to the treating position, the drive means being responsive to the timing means for moving the carrier arm to the treating position after the timing means has timed the delay period.

28. A device for treating a moving head and/or a drum of a playback and/or recording unit, the unit being of the type comprising a receiving area for receiving a cassette, and having at least one rotatable reel spindle in the cassette receiving area for engaging a tape reel in a cassette, the device comprising:
    a main support member engagable in the cassette receiving area of the unit,
    a treatment means for cleaning, polishing or buffing the head and/or drum,
    a carrier arm for carrying the treatment means, the carrier arm being mounted on the main support member and being movable from a rest position with the treatment means spaced apart from the head and/or drum, in use, to a treating position with the treatment means engaging the head and/or drum, in use,
    drive means for moving the carrier arm for the rest position to the treating position,
    timing means for controlling the drive means, the timing means being operable from a set position to a timed out position for timing a timing cycle and being settable from the timed out position to the set position, and transmission means for driving the timing means from the set position to the time out position, the timing means being disengagable from at least a portion of the transmission means to facilitate setting the timing means from the timed out position to the set position.

29. A device as claimed in claim 28 in which the transmission means is operably engagable with one of the reel spindles of the unit.

* * * * *